(12) United States Patent
Fantin et al.

(10) Patent No.: US 7,316,202 B2
(45) Date of Patent: Jan. 8, 2008

(54) DEVICE AND METHOD FOR ANIMAL TRACKING

(75) Inventors: Dennis Fantin, Danville, CA (US); Stephen Bates, Davis, CA (US); Bridger Feuz, Antelope, CA (US); Sue K. DeNise, Davis, CA (US); Tom Holm, Salt Lake City, UT (US)

(73) Assignee: MMI Genomics, Inc., Davis, CA (US)

( * ) Notice: Subject to any disclaimer, the term of this patent is extended or adjusted under 35 U.S.C. 154(b) by 0 days.

(21) Appl. No.: 11/518,390

(22) Filed: Sep. 8, 2006

(65) Prior Publication Data

US 2007/0062457 A1   Mar. 22, 2007

Related U.S. Application Data

(63) Continuation of application No. 10/753,698, filed on Jan. 7, 2004, now Pat. No. 7,107,936.

(60) Provisional application No. 60/500,878, filed on Sep. 4, 2003.

(51) Int. Cl.
*A01K 29/00* (2006.01)

(52) U.S. Cl. .................. 119/174; 452/198; 40/300

(58) Field of Classification Search .............. 40/300; 119/174, 712; 452/53, 198
See application file for complete search history.

(56) References Cited

U.S. PATENT DOCUMENTS

| | | | |
|---|---|---|---|
| 3,952,438 A | 4/1976 | Propst et al. | |
| 4,506,630 A | 3/1985 | Hair | |
| 4,646,455 A | 3/1987 | Gardner | |
| 4,694,781 A | 9/1987 | Howe et al. | |
| 4,885,855 A | 12/1989 | Marks, Sr. et al. | |
| 5,016,369 A | 5/1991 | Perry | |
| 5,473,830 A | 12/1995 | Doble | |
| 6,095,915 A | 8/2000 | Geissler et al. | |
| 2003/0062001 A1 | 4/2003 | Andersson et al. | |
| 2004/0150528 A1 | 8/2004 | Natividade et al. | |
| 2005/0228310 A1 | 10/2005 | Pfistershammer | |

*Primary Examiner*—Rob Swiatek
(74) *Attorney, Agent, or Firm*—DLA Piper US LLP

(57) ABSTRACT

Devices and methods for tracking animals include assigning an animal identification to a first animal. Collecting a biological sample from the first animal and associating the first animal with each premises at which the first animal is located. The invention further provides an identification device that includes a tag portion and a sample portion. The tag portion can be configured to be attached to an animal in any method known in the art. The sample portion can be detachably coupled to the tag portion and can include a biological collector that can collect a biological sample from the animal.

15 Claims, 14 Drawing Sheets

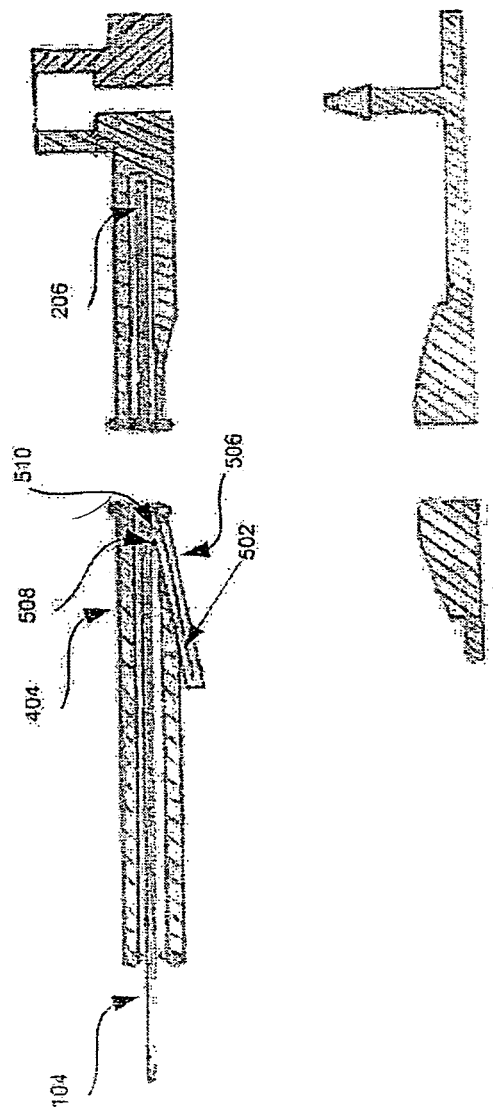
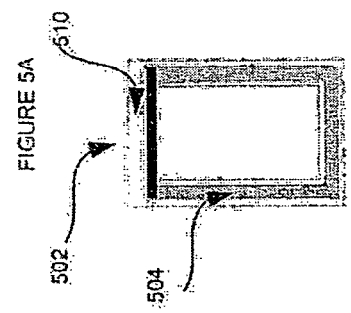
FIGURE 5A
FIGURE 5B

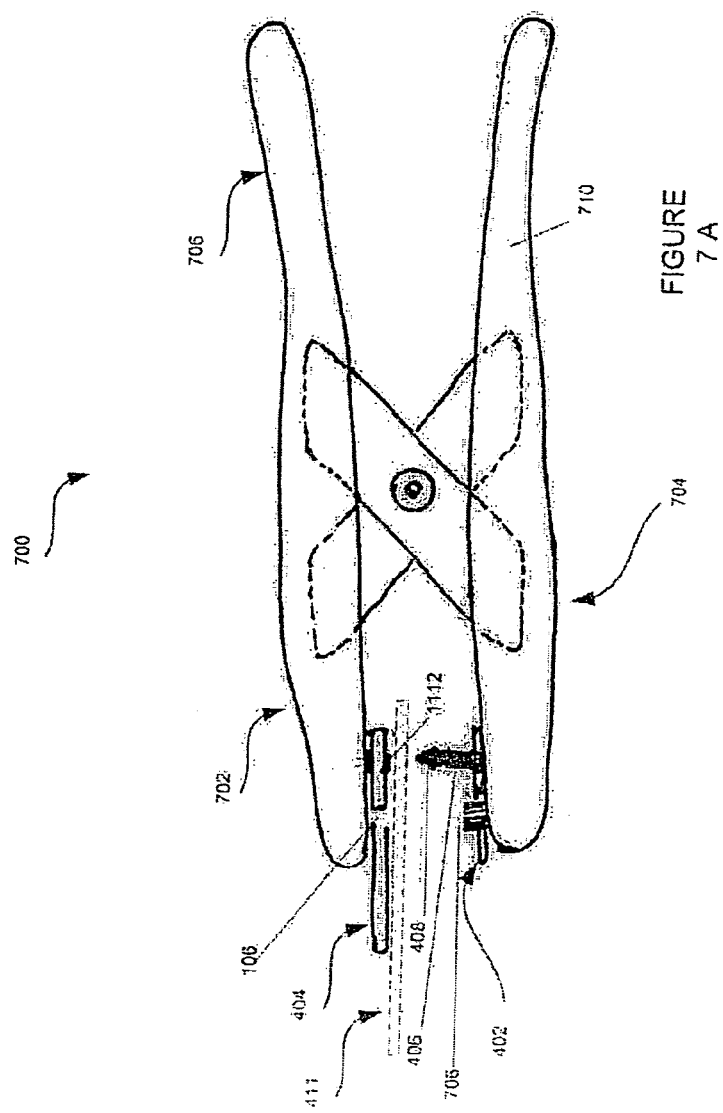
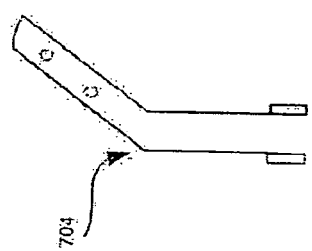
FIGURE 7A
FIGURE 7B

DEVICE AND METHOD FOR ANIMAL TRACKING

CROSS REFERENCE TO RELATED APPLICATION(S)

Under 35 USC § 120, this application is a continuation application of U.S. application Ser. No. 10/753,698 filed Jan. 7, 2004, now issued as U.S. Pat. No. 7,107,936; which claims the benefit under 35 USC § 119(e) to U.S. Application Ser. No. 60/500,878 filed Sep. 4, 2003, now abandoned. The disclosure of each of the prior applications is considered part of and is incorporated by reference in the disclosure of this application.

BACKGROUND OF THE INVENTION

1. Field of the Invention

This invention relates generally to identifying animals. More particularly, the present invention relates to devices and methods for identifying and tracking animals based on animal identifiers and biological samples.

2. Background Information

Many systems of animal identification currently exist, such as ear tags, branding, tattoos, visual tags, bar codes, radio frequency identification ("RFID") implants, RFID tags, DNA sampling and retinal imaging. Each of these technologies suffers shortcomings with respect to retention, alterability, cost or ease of use. Ear tags, RFID tags and visual tags, for example, are subject to retention problems as an animal can snag and break the tag on fences, trees or other obstructions. Moreover, tags, brands and tattoos can be altered, while RFID implants can be removed.

While DNA sampling and retinal imaging do not possess the same shortcomings with respect to retention and alterability, current methods of DNA sampling and retinal imaging are also deficient. Current DNA sampling techniques use a tissue sample extracted from animals to identify a particular animal. The tissue samples must be processed according to special techniques and do not provide readily available identification of individual animals in the field. Moreover, the tissue samples must be frozen to keep for a long period of time. Retinal imaging techniques, similarly, require costly equipment and, like DNA samples, the identification information produced by current retinal imaging techniques is difficult to match to a particular animal in the field. Despite these deficiencies, DNA sampling and retinal imaging are the only technologies that allow reliable quantitative quality control auditing of live animals.

None of the existing technologies have been used effectively in a process to track animals or their meat products from birth to consumption. This is of concern because food animals are at risk from contamination by a large number of biological agents, including, but not limited to: Hog Cholera, Avian Influenza, African Swine Fever, Bovine Spongiform Encepholpathy, Foot and Mouth Disease, Newcastle Disease, Cholera, Shigellosis, Anthrax, Smallpox, Plague, Ebola, Botulism, Rift Valley Fever Virus and bioengineered pathogens. Because of the fast livestock production and processing systems currently employed, there is a potential for fast transport and transference of such disease agents between animals and to humans from contact with the animals or their meat products. Without a well defined animal identification and tracking process for food animals, contamination or adulteration of the meat supply, either naturally or as the result of manmade conditions (e.g., bioterrorism), can remain undetected until a large number of people or animals have been impacted. The ability to accurately and quickly identify and track individual animals and their meat products from birth to consumption is critical for the containment of any incidents of contamination or disease outbreak and minimizing any resulting adverse effects. Additionally, prior systems have typically not been used to effectively identify, track and select genotypes, traits or animal characteristics in animals, such as meat production animals, that regularly change locations and owners.

SUMMARY OF THE INVENTION

Embodiments of the present invention provide systems and methods of identifying, sampling and tracking animals that substantially eliminate or reduce the disadvantages of previously developed animal identification and tracking systems and methods. In particular, embodiments of the present invention include an identification device that comprises a tag portion and a sample portion. The tag portion can be configured to be attached to an animal in any method known in the art. The sample portion can be detachably coupled to the tag portion and can include a biological collector that can collect a biological sample from the animal. The tag portion, according to one embodiment of the present invention, can include an aperture that can allow blood from an animal to pool. The sample portion can be positioned to allow the biological sample collector to be drawn across the sample site to collect a blood sample when the sample portion is decoupled from the tag portion. This can allow a biological sample to be collected from an animal at approximately the same time as an animal identification is assigned to the animal. The biological sample can be analyzed to determine an animal's genetic identity, breed, pedigree, genetic potential and predict phenotype for important processing, production and health traits.

Moreover, embodiments of the present invention provide a method of tracking an animal that comprises assigning an animal identification to an animal, collecting a biological sample from the animal and associating the animal with each premises at which the animal is located. Embodiments of the present invention can further comprise determining a set of animals that were at a same location at a same time as the animal based on associations between each animal from the set of animals and the premises at which each animal from the set of animals was located. This can aid in locating animals that potentially came in contact with an animal affected by disease or other contamination. This can also assist in the management of breeding, feeding and production strategies of animals based on predicted phenotypes, breeds or pedigrees. Additionally, an embodiment of the present invention can include assigning the animal to a group corresponding to animals slaughtered together. Embodiments of the present invention can further include identifying a meat product, determining that a meat product is associated with the group to which the animal belongs, locating a set of biological samples corresponding to each of the set of animals belonging to the group and comparing an analysis of the meat product to an analysis of at least a portion of the set of biological samples to determine that the meat product came from the animal.

Another embodiment of the present invention can include a set of computer instructions stored on a computer readable medium that are executable by a processor to receive an animal identification for an animal and associate the animal identification with a premises identification for each premises at which the animal is located. The computer instructions can also be executable to determine each premises at which the animal was located based on the animal identification and the associated premises identifications and determine a set of animal identifications for animals that where at the same locations during overlapping time periods. Additionally, the computer instructions can be executable to determine a set of animal identifications associated with a group identification.

Embodiments of the present invention provide a technical advantage over previously developed animal identification and tracking systems by allowing an animal identification to be assigned an animal and a biological sample to be collected from the animal in one process.

Embodiments of the present invention provide yet another advantage over previously developed animal identification and tracking systems by collecting a biological sample against which assignments of animal identifications can be audited.

Yet another advantage provided by an embodiment of the present invention is that it provides an easily readable system of identifying animals (e.g., a tag) in the field while also providing a highly reliable identification source (e.g., a biological sample).

Yet another advantage provided by embodiments of the present invention is that an animal can be tracked both post harvest and pre-harvest.

As an additional advantage provided by embodiments of the present invention, animals that potentially came in contact with a particular animal can be identified. This can aid in locating the source of a bio-incident and containing the bio-incident.

A tagging device of the invention, including tracking methods, are useful to identify, track and select animals, e.g., parentage and pedigree determination, breed determination, progeny selection, branding and certification of value-added products, protection of animal germ lines and proprietary genetics, determination of genetic potential, phenotype prediction, feedlot management, and management of breeding and cloning strategies, for example.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIG. 5A is a diagrammatic representation of embodiment of a tamperproof identification device and FIG. 5B is a diagrammatic representation of one embodiment of a film that can be used in the device of FIG. 5A;

FIGS. 7A and 7B are diagrammatic representations of an application device according to one embodiment of the present invention;

DETAILED DESCRIPTION OF THE INVENTION

Preferred embodiments of the present invention are illustrated in the FIGUREs, like numerals being used to refer to like and corresponding parts of the various drawings.

Embodiments of the present invention provide a system and method of identifying, sampling and tracking animals. According to one embodiment of the present invention, an identification device can placed on an animal. The identification device can comprise a tag portion that is configured to remain attached to an animal and a sample portion that is configured to retain a biological sample from the animal. Each of the tag portion and the sample portion can contain a common identifier (e.g., number, bar code, RFID or other identifier known in the art). Because the tag portion and the sample portion each contain a common identification, a biological sample and particular animal can be readily associated.

Figure 1:
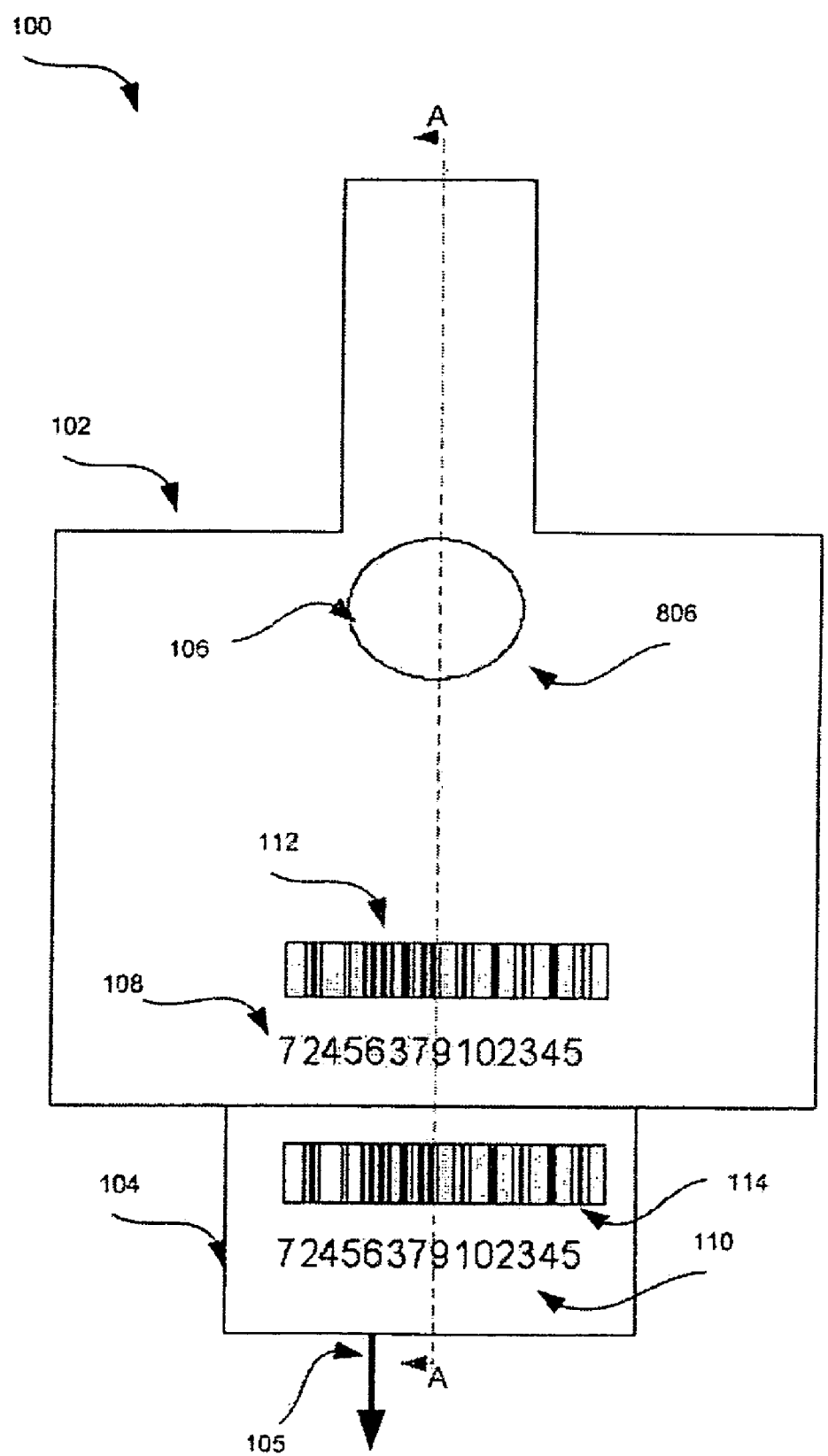
FIG. 1 is a diagrammatic representation of an identification device for providing an animal with an animal identification and collecting a biological sample from the animal.

FIG. 1 is a diagrammatic representation of a device 100 for providing an animal with an animal identification and collecting a biological sample from the animal at approximately the same time. Device 100 can include a tag portion 102 and a sample portion 104, each of which, in one embodiment of the present invention can be primarily made of a durable plastic or metal. In one embodiment of the present invention, sample portion 104 can be partially inserted into tag portion 102 and can be coupled to tag portion 102 through friction, an adhesive, a connector or other manner known in the art. Sample portion 104 can further include a biological sample collector to collect a biological sample, such as a blood sample, from an animal. In one embodiment of the present invention, sample portion 104 can be located relative to tag portion 102 such that the biological sample collector is positioned proximate to a sampling site. The sampling site can be defined, for example, by aperture 106 in tag portion 102 that can allow blood to flow, seep or otherwise come in contact with to sample portion 104.

Tag portion 102 can be attached to animal in any conventional manner known in the art, such as by attachment to an animal's ear. During attachment, the application device (discussed in conjunction with FIG. 7A) can pierce the animal in an area approximately aligned with aperture 106. Blood can then pool in aperture 106. When sample portion 104 is decoupled from tag portion 102 by, for example, pulling in direction 105, the biological sample collector can be drawn across the pooled blood to collect a blood sample.

Because the biological sample can be collected during application of the tag portion, the animal identification can be assigned and biological sample collected at approximately the same time.

Tag portion 102 and sample portion 104 can include matching animal identification 108 and animal identification 110, respectively. Additionally, they can include corresponding machine readable identifications (e.g., bar code 112 and bar code 114, or RFIDs) that are discernable by a computer or automated system. By including matching identifications on the tag portion and sample portion, an animal identification can be assigned to an animal and can be associated with a biological sample from the animal. In one embodiment of the present invention, the animal identification associated with each device 100 can be a unique animal identification. By including corresponding identifications on the tag portion and sample portion, a biological sample can be readily associated with a particular animal identification.

Thus, one embodiment of the present invention can comprise a tag portion and a sample portion detachably coupled to the tag portion. The tag portion can be configured to be attached to animal in any method known in the art. Although illustrated as an ear tag, the tag portion can include a tag that can be attached to an animal in any manner (e.g., to an ear, a wing or in any other manner known in the art). The sample portion can be detachably coupled to the tag portion and can include a biological collector that can collect a biological sample from the animal. In one embodiment of the present invention, the biological sample can be collected as the sample portion is decoupled from the tag portion. For example, the tag portion can contain an aperture that can allow blood to pool during attachment of the tag portion. The biological collector portion can collect a sample of the pooled blood as the sample portion is withdrawn from the tag portion.

Figure 2:
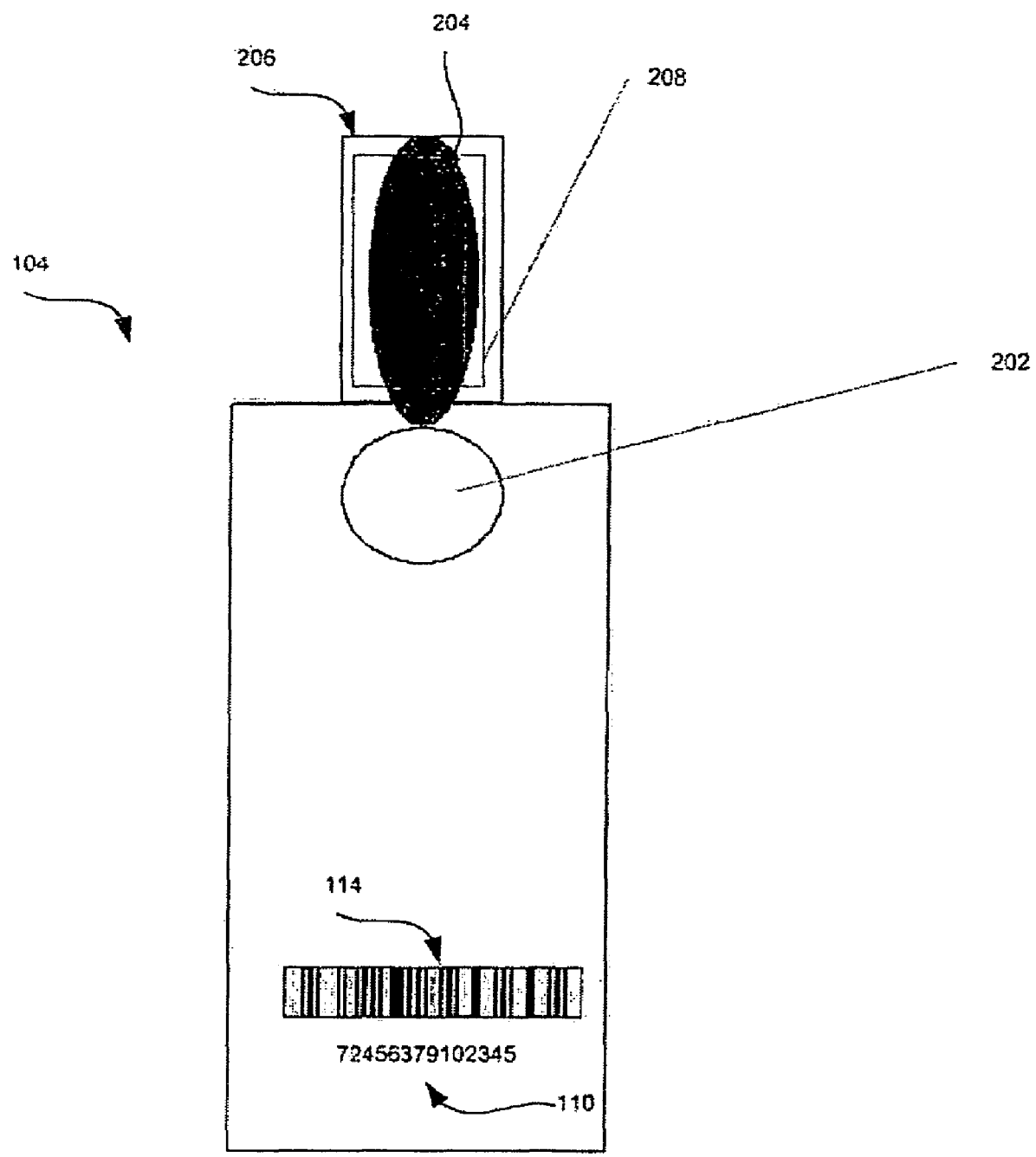
FIG. 2 is a diagrammatic representation of one embodiment of a sample portion of an identification device after a biological sample has been collected.

FIG. 2 is a diagrammatic representation of one embodiment of a sample portion 104 after a biological sample has been collected. Sample portion 104 can include an aperture 202 that overlaps with aperture 106 of FIG. 1. During application of an identification device, an animal can be pierced in an area near aperture 202. As sample portion 104 is removed from the tag portion of the identification device, a blood smear 204 can be created on collector portion 206. Collector portion 206 can include any biological sample collector 208 known in the art. For example, collector portion 206 can include FTA paper 208 (FTA is a trademark of Whatman Group, Whatman International Ltd. based in Kent England) for collection and stabilization of a blood sample. As would be understood by those of ordinary skill in the art, FTA paper is a paper that has undergone a chemical treatment that allows for the rapid isolation of pure DNA. The DNA sample collected by the FTA paper can remain stable at room temperature for years and can, thus, be easily archived. FTA paper can include paper of variety of weights impregnated with the FTA chemical. According to one embodiment of the present invention, FTA paper of a sufficient durability can be adhered to a plastic or metal backing of collector portion 206. In other embodiments of the present invention, the FTA paper can be coupled to sample portion 104 in any suitable manner as would be understood by those of ordinary skill in the art.

According to one embodiment of the present invention, sample portion 104 can be positioned with respect to a tag portion, such that biological sample collector 208 is proximate to a blood pooling site. When sample portion 104 is moved relative to the tag portion, a blood smear 204 can be created that comes in contact with biological sample collector 208, which can capture a blood sample from the blood smear. Sample portion 104 can be shaped for easy transport (such as in an envelope or a rack of sample portions) and can include a biological sample collector 208, such as FTA paper, that can create a stable biological sample for long-term storage. Animal identification 110 and bar code 114 can aid in automated retrieval of sample portion 104 from an archive of sample portions. The collected biological sample can be processed for analysis by biological and/or chemical methods. Examples of molecules that can be analyzed from the collected biological sample include DNA and RNA markers, causative genetic mutations, targeted DNA and RNA sequences, whole genome DNA and RNA sequences, proteins, peptides, hormones, carbohydrates, lipids, small molecules, antigens, antibodies and/or any other chemicals that affect the well being and health of an animal including animal host pathogens and infectious agents.

Figure 3:
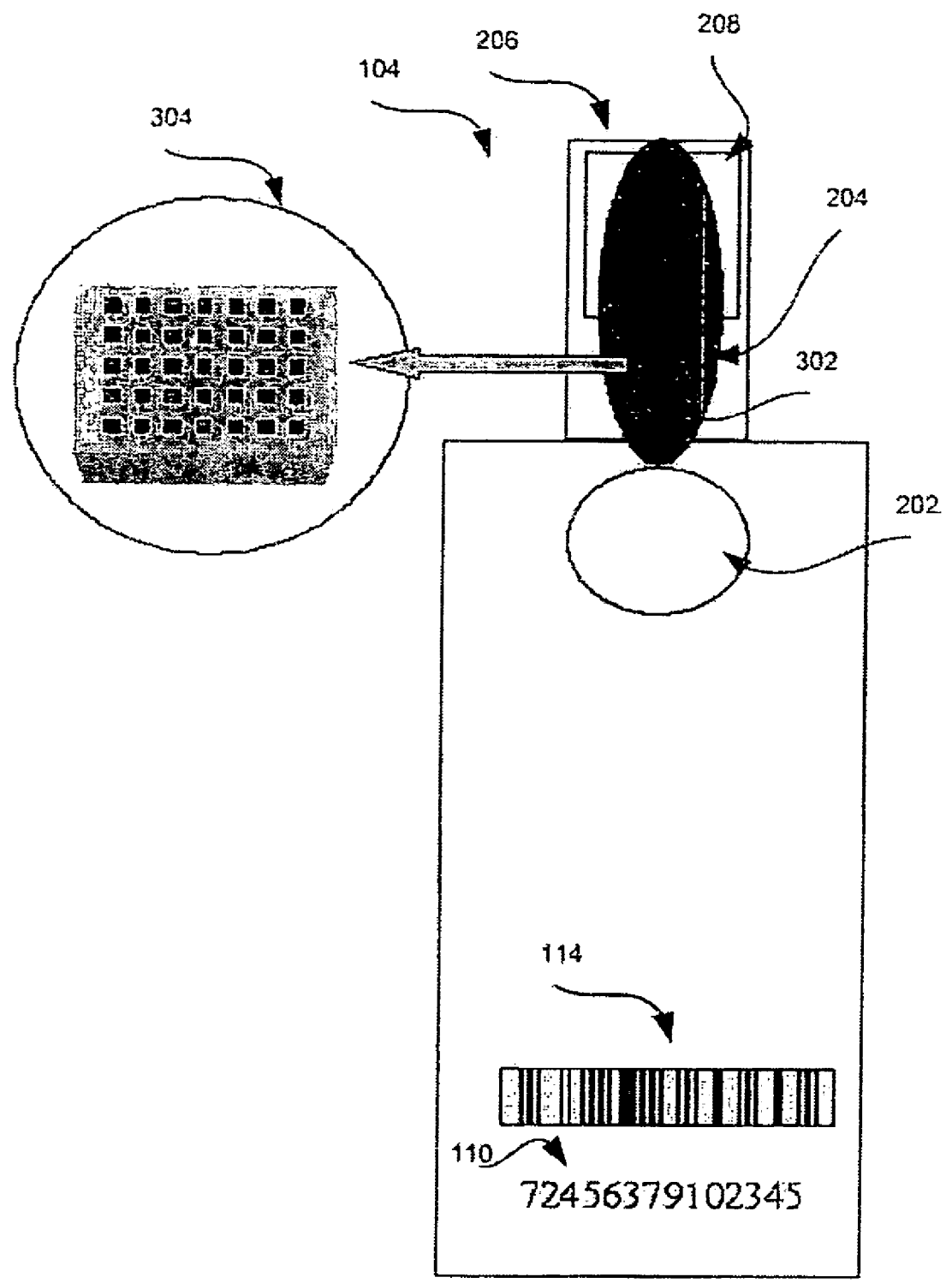
FIG. 3 is a diagrammatic representation of another embodiment of sample portion of an identification device according to the present invention.

FIG. 3 is a diagrammatic representation of another embodiment of sample portion 104 according to the present invention. In addition to including a biological sample collector 208, sample portion 104 can include reagents 302 that are located such that it will come in contact with blood smear 204. Reagents 302 can be attached to or embedded in sample portion 104. It should be noted that any reagent known in the art can be included in sample portion 104. Reagents 302 can include a matrix 304 of reagents that are configured to detect various molecules in blood smear 202 that indicate the health or performance of an animal. It should be noted that any reagent known in the art can be imbedded in or attached to sample portion 104.

Figure 4:
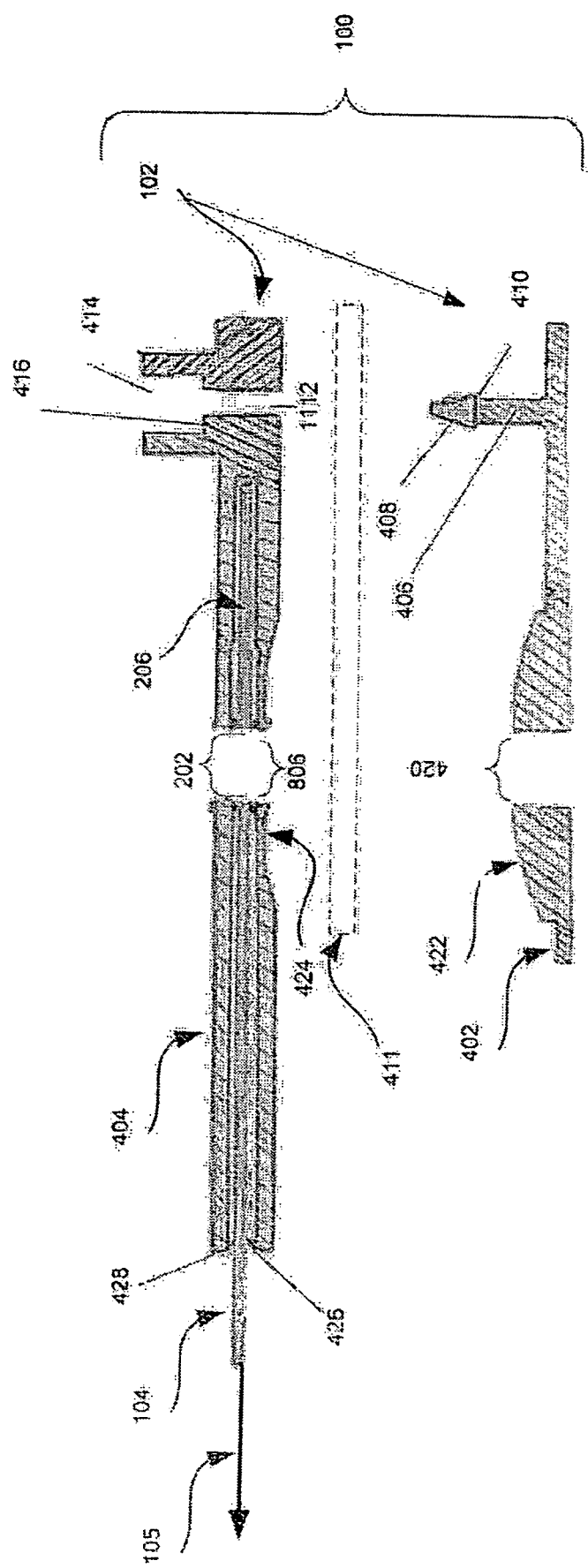
FIG. 4 is a diagrammatic representation of a fragmentary view of an identification device, according to one embodiment of the present invention.

FIG. 4 is a diagrammatic representation of a fragmentary view of identification device 100 along line A-A of FIG. 1. Identification device 100 can include tag portion 102 and sample portion 104, with tag portion 102 including a male portion 402 and a female portion 404. In the embodiment of FIG. 3, sample portion 104 can be at least partially enclosed by female portion 404. Male portion 402 can include a stem 406, with a piercing wedge 408 having a surface 410 that is wider than the stem 406. Piercing wedge 408 can have a sharp edge and can be designed to pierce an animal easily, with minimal bleeding and lock into the female portion 404. Using an application device, as depicted in FIG. 7A, wedge 408 and stem 406 of the male portion pass through a portion of an animal, such as its ear (represented by 411), and enter into the hollow shaft 412 of the female portion 404. Wedge 408 can be made of a material that can distort during insertion in shaft 412 allowing shaft 412 to be slightly smaller in diameter than surface 410.

In one embodiment of the present invention, piercing wedge 408 can enter seating portion 414, which can be wider than shaft 412, and expand or become less distorted. Surface 410 can rest on surface 416 after wedge 408 has fully entered seating portion 414, preventing piercing wedge 408 from moving back down shaft 412 and, hence, locking male portion 402 and female portion 404 together. In this manner, wedge 408 can be inserted into female portion 404, but can not be easily removed. The male/female portions are provided by way of example, and it should be noted that identification device 100 can be attached to an animal in any manner known in the art and can incorporate systems known in the art for preventing tag breakage or loss.

Male portion 402, female portion 404 and sample portion 104 can contain apertures (e.g., aperture 106 through female portion 404, aperture 202 through sample portion 104 and aperture 420 through male portion 402). According to one embodiment of the present invention, an animal can be pierced through aperture 420 by, for example, a grid of pins (506 in FIG. 5A) on an application device. The grid of pins can pierce the portion of the animal in alignment with the apertures and blood can then pool in the area of aperture 106 and aperture 202. In another embodiment of the present invention, apertures do not go all the way through female portion 404 and sample portion 104. Instead, female portion 404 can have an aperture approximately aligned with and facing aperture 420 to allow blood to come in contact with sample portion 104 when the animal is pierced through aperture 420. In other words, aperture 106 does not have to go completely through female portion 402, but need only provide an opening to allow sample portion 102 to collect blood from the sample site.

In one embodiment of the present invention, a raised or convex area 422 on the male portion 402, located proximate to aperture 420, can be designed to move the ear in closer proximity to the female portion 404, and form a tighter contact at the sight of blood pooling. Female portion 404 can include a corresponding recessed or concave area 424 to receive convex area 422, thereby aiding in forming a tighter contact between ear 411 and female portion 404.

Sample portion 104 can be partially enclosed in female portion 404 and can be coupled to female portion 404 through a connector, such as breakable plastic tabs 426 and 428, by friction or in any other manner known in the art. Sample portion 104 can be decoupled from female portion 404, in one embodiment of the present invention, by pulling sample portion 104 in direction 105. As sample portion 104 is decoupled from female portion 404, collector portion 206 can be drawn across the sampling site (e.g., the blood pooling site) to collect a blood sample. In this case, collector portion 206 is located sufficiently proximate to the site of blood pooling such that the blood will smear on collector portion 206 and the biological sample collector 208 (e.g., FTA paper) when sample portion 104 is removed from female portion 404.

In yet another embodiment of the present invention, the tag portion 102 can allow blood to come in contact with sample portion 104 in any manner. For example, female portion 404 can be partially or completely open on the side that faces the male portion, allowing sample portion 104 to come in direct contact with ear 411 when identification device 100 is applied. When sample portion 104 is decoupled from female portion 404, collector portion 206 can be drawn across the area of ear 411 that is pierced by the application device. In another embodiment of the present invention, collector portion 206 can be located proximate to the sampling site such that blood comes in contact with collector portion 206 without having to decouple sample portion 104 from tag portion 102.

Thus, one embodiment of the present invention can include an identification device comprising a tag portion for attachment to an animal and a sample portion detachably coupled to the tag portion, the sample portion further comprising a biological sample collector (e.g., FTA paper or other sample collector known in the art) to collect a biological sample from the animal. In one embodiment of the present invention, the tag portion is configured to allow blood to contact the sample portion when the tag portion is attached to the animal. The sample portion, can be configured to collect a blood sample either when in place or when decoupled from the tag portion.

Another embodiment of the present invention can include an identification device comprising a tag portion with a sample portion that is configured to be tamperproof. FIG. 5A is a diagrammatic representation of a fragmentary view of one embodiment of a tamperproof embodiment of an identification device and FIG. 5B is a diagrammatic representation of one embodiment of a film for use with a tamperproof identification device of FIG. 5A. The identification device contains a transparent film 502 that layers over the collector portion 206 when the sample portion 104 is decoupled from female portion 404. The transparent film binds tightly to collector portion 206 of the sample portion 104. A new sample can be adequately deposited on the biological collector of sample portion 206 after the transparent film has been applied to the card. If an attempt is made to remove the transparent film, a portion of the collector portion can be removed with the transparent film and is visual evidence that sample portion 104 and the collector portion 206 have been putatively tampered with. In one embodiment of the present invention, the transparent film, once removed from the collector portion 206 cannot be reapplied.

Transparent film 502 can be made of thin plastic and has a strong adhesive 504 layered around the edges. The adhesive portion is covered with a removable non-stick film to prevent the transparent film 502 from sticking to itself or unwanted surfaces. The transparent film 502 lies inside a cassette 506 that is a molded part of the female portion 404 of identification device 100. The cassette 506 has a molded bead 508 that extends into the cavity of female portion 404 and abuts the sample portion 104. The leading edge 510 of the transparent film 502 is attached (melded) to the sample portion 104 of the identification device 100 as part of the manufacturing process. The front edge of the non-stick coating that covers the adhesive material 504 is anchored (melded) into the plastic body of the female portion 404 of the identification device 100. The identification device 100 is attached to an animal in any manner and a biological sample collected form the animal. When the sample portion 104 is removed in direction 105 from the female portion 404 of the identification device 100 the transparent film 502 is pulled out of the cassette 504 since the leading edge 510 is attached to the sample portion 104. As the transparent film 502 is pulled out of the cassette 506, the non-stick portion covering the adhesive 504 peels off since the front edge is anchored to the body of the female portion 404 of the identification device 100. The beaded portion 508 of the cassette applies pressure against the transparent film 502 as it is pulled out of the cassette 506, allowing the exposed adhesive 504 on the transparent film 502 to contact the sample portion 104 and form a strong bond around the edges of the collector portion 206. The transparent film 502 is fully transferred to the sample portion 104 and covers the collector portion 206 tightly. Any attempts to remove the transparent film 502 from the collector portion 206 can show evidence of tampering.

Figure 6:
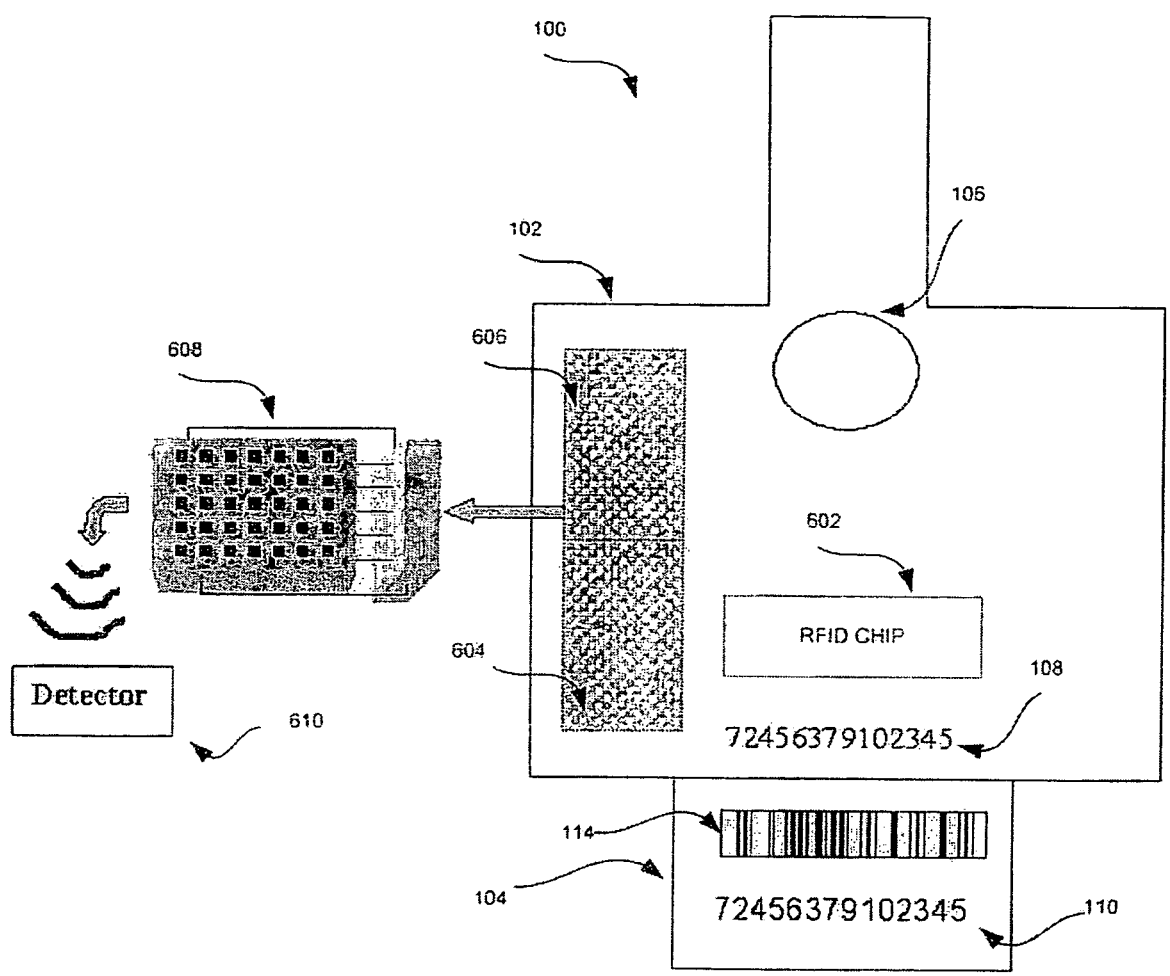
FIG. 6 is a diagrammatic representation of another embodiment of an identification device

FIG. 6 is a diagrammatic representation of another embodiment of an identification device 100. Device 100 can include a tag portion 102 and a sample portion 104. In one embodiment of the present invention, tag portion 102 and sample portion 804 are primarily made of a durable plastic or metal. Sample portion 104 can be include a biological sample collection material to collect a biological sample, such as a blood sample, from an animal. In one embodiment of the present invention, sample portion 104 can be located relative to tag portion 102 such that the biological sample collector is positioned proximate to a sampling site. In the embodiment of FIG. 6, sample portion 104 can be at least partially enclosed by tag portion 802 and can be removed from sample portion 104 in direction 105. Tag portion 102 can define an aperture (represented by aperture 106) at which an animal can be pierced to draw a blood sample.

Tag portion 102 and sample portion 104 can include matching animal identification 108 and animal identification 110, respectively. Additionally, they can include corresponding machine readable identifications (e.g., RFID chip 602 and bar code 114) that are discernable by a computer or automated system. By including matching identifications on the tag portion and sample portion, an animal identification can be assigned to an animal and can be associated with a biological sample from the animal. The use of an RFID chip on tag portion 102 to communicate the animal identification to a computer or automated system can be useful because a bar code on tag portion 102 may be obfuscated by dirt, making the animal identification difficult to automatically detect without first cleaning tag portion. Any or no machine readable identification (e.g., bar code, RFIDs, computer recognizable symbol or other mechanism known in the art) can be used for enabling automatic determination of an animal identification by a computer system.

Tag portion 102, according to one embodiment of the present invention, can include reagents 604 and imbedded biosensors 606. Reagents 604 can include any reagent known in the art and can be used to diagnose the health and performance of the animal. In one embodiment of the present invention, reagents 604 can be reactive to the skin or excretions of the animal to detect the health or performance of the animal. In another embodiment of the present invention, reagents 604 can include reagents configured to indicate the genotype of the animal based, for example, on a biological sample from the animal applied to the reagent. This can allow the genotype of the animal to be detectable in the field to help guide, for example, care and feeding of the animal to produce better meat products. Biosensors 606 can also be included to detect infection, health and performance characteristics of an animal. A particular biosensor (e.g., biosensor 608) can be read by a detector 610 during the production cycle to help identify a diseased animal or gather other data regarding an animal.

FIG. 7A is a diagrammatic representation of an application device 700 according to one embodiment of the present invention. Application device 700 can include a male portion base 702 for male portion 402 and female portion base 704 for female portion 404 of the identification device. In one embodiment of the present invention, female portion base 704 and male portion base 702 can be angled, to allow for easier application of an identification device (see FIG. 13B) to an animal's ear. Male portion 402 and female portion 404 can be secured to their respective base in any manner known in the art. Male portion base 702 can include a piercing device 706 designed to pierce ear 411 to produce a biological sample. In one embodiment of the present invention, piercing device 706 can be a grid of pins, a single pin, a blade or any other device capable of causing ear 411 to bleed. Piercing device 706 can be an integral part of male portion base 702 or can be coupled to male portion base 702 in any manner known in the art (e.g., machining, welding, riveting, screw or other attachment scheme known in the art). Piercing device 706 can pass through the aperture in male portion 404 (e.g., aperture 420 of FIG. 4). Male portion base 702 can, in one embodiment of the present invention, include a locking pin that inserts into stem 406 of male portion 402. The locking pin can be hollow to allow medicine or other substances to be introduced to an animal as the identification device is applied.

Male portion base 702 and female portion base 704 can be brought together by application of force to handle 708 and handle 710. As male portion base 702 and female portion base 704 are brought together, piercing wedge 408 will pass through ear 411, enter shaft 412 and become locked in a seating portion as described in conjunction with FIG. 4. Additionally, piercing device 706 will pierce ear 711 near 106 of female portion 704. Blood can pool at aperture 106 until male portion base 702 and female portion base 704 are separated. The sample portion in female portion 404 can then be removed with biological sample collector of the sample portion collecting a blood sample as it is drawn across the pooled blood in aperture 106. In this manner, an animal identification can be assigned to an animal using a tag and a biological sample can be collected from the animal at approximately the same time.

In one embodiment of the present invention, the tag portion can remain with an animal while the biological sample can be archived. Because a biological sample is stored for an individual animal, the identity of animal can be confirmed by comparing a new biological sample for the animal to the archived sample. If the new biological sample does not match the archived biological sample for the corresponding animal identification, it can be an indication that the tag portion was tampered with or changed.

The ability to associate biological samples and tag portions attached to animals can facilitate identification and tracking of animals and their meat products. According to one embodiment of the present invention, each animal can be assigned an animal identification using an identification device. Additionally, each location (such as farm, processing plant or other arbitrarily defined location) which an animal may be housed can be assigned a premises identification. Animal's can be associated with particular locations using a database that associates animal identifications with premises identifications. Additionally, the database can associate animals with owners by associating animal identifications with owner identifications. As an animal changes owners and/or locations, the premises and/or owner identifications associated with the animal identification for that animal can be updated. By tracking the location and/or owner of each animal, the database can effectively track the progress of an animal through a production cycle during the animal's life. Additionally, by maintaining biological samples for animals, an animal that produced a particular meat product can be identified post-harvest based on a comparison of the meat product and the archived biological sample for the animal.

Figure 8:
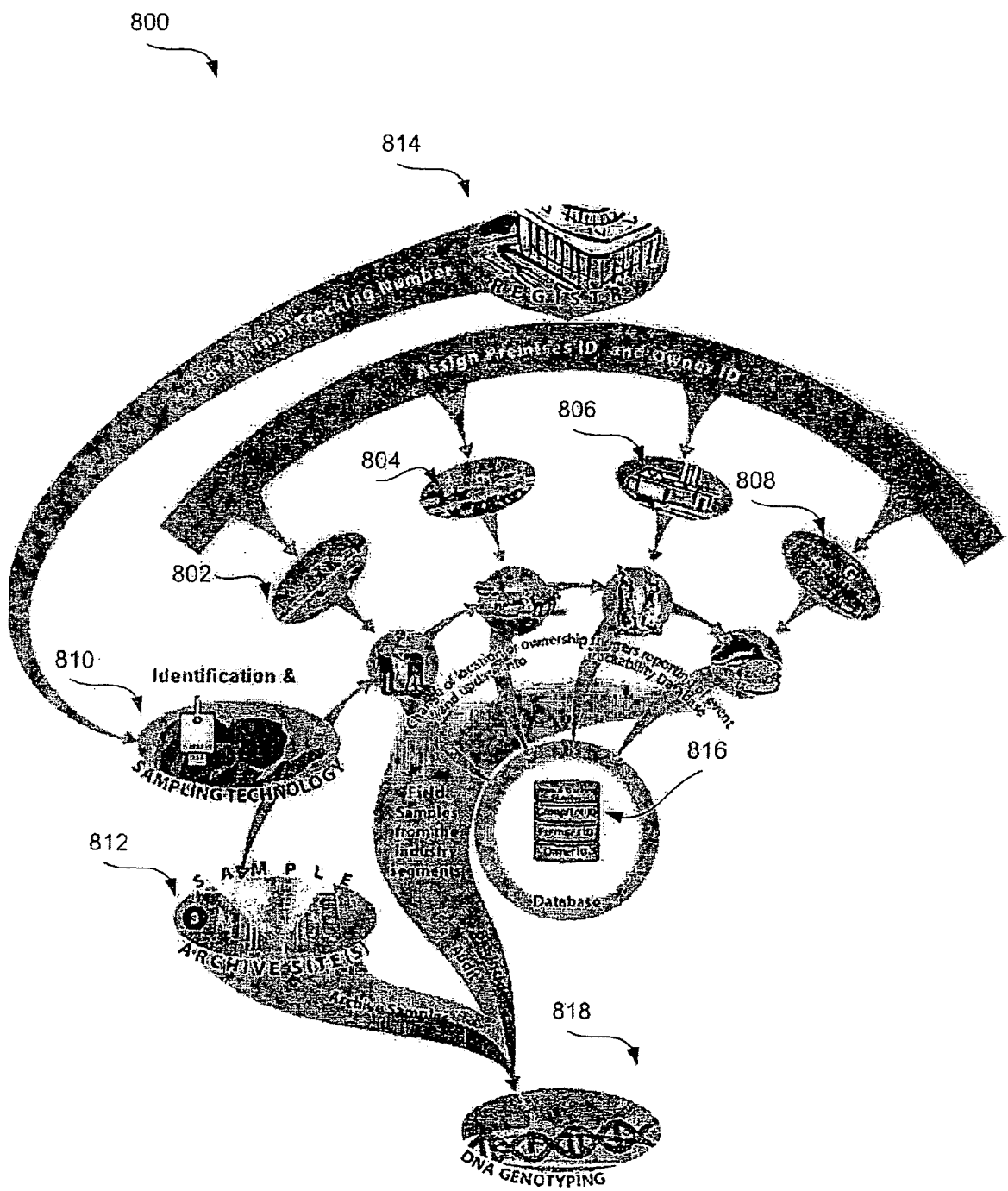
FIG. 8 is a diagrammatic representation of a system for identifying and tracking animals according to one embodiment of the present invention.

FIG. 8 is a diagrammatic representation of a system 800 for tracking animals according to one embodiment of the present invention. During the production cycle for meat products, an animal can be at various premises. For example, an individual animal can be at the farm 802, at which it is born, a feedlot 804 for preparation, a processing/packing plant 806 for harvest and a grocery store 808 for sale to an end customer. Embodiments of the present invention can allow an individual animal to be tracked through the entire production cycle, including post-harvest, and allow individual animals to be associated together based on their owners, locations or other factors.

According to one embodiment of the present invention, each animal can be assigned an animal identification (represented at 810) by, for example, providing the animal with an identification device in the form an ear tag, a RFID tag, a RFID implant or other identification device. Additionally, a biological sample (e.g., blood, mucus, fluid, tissue, skin or other biological sample known in the art) can be taken from the animal. The biological sample can be associated with the animal identification assigned to the animal and can be archived at sample archive site(s) 812. Embodiments of devices for assigning an identification to an animal using a tag portion of an identification device and taking a biological sample from the animal at approximately the same time using a sample portion of the identification device are illustrated in FIGS. 1-6.

Embodiments of the present invention can also assign identifications to premises. A premises can be arbitrarily defined to include any place where an animal may be located and/or come in contact with other animals, such as breeders, farms, ranches, auction yards, fair grounds, transit vehicles, production plants, slaughter houses, stores or other premises. For the sake of example, each of farm 802, feedlot 804, processing plant 806, and grocery store 808 can be assigned a premises ID. Additionally, each animal owner can be assigned an owner identification. Animal, premises and owner identifications can be managed, in one embodiment the present invention, through a centralized registry 814 to ensure that each animal, premises and/or owner is assigned a unique identification.

Embodiments of the present invention can track an animal's progress through the production cycle based on associations between animal identifications, owner identification and premises identifications maintained in database 816. Until harvest, the unique identification of a particular animal can be ascertained based on the identification device attached to the animal (e.g., tag, RFID implant, or other identification device known in the art) and, therefore, the animal can be easily tracked from premises to premises, owner to owner. As an example, when an animal is born at farm 802, the animal breeder can assign the animal a unique identification, by for example, attaching an ear tag to the animal that contains a unique animal identification number. The animal breeder can communicate the unique animal identification, owner identification and premises identification to database 816. When the animal moves to feedlot 104, the feedlot operator can read the animal identification from, for example, an ear tag and send the animal identification and feedlot identification to database 816 to update the premises identification for the animal. Thus, each time the animal changes premises and/or owners, database 816 can be updated to reflect the changes.

After harvest, the unique animal identification will typically not be ascertainable from the device attached to the animal, as it is unlikely that the identification device will travel with the animal carcass or meat products. To aid in identifying animals after harvest, biological samples can taken from the animals. For example, an animal breeder, at farm 802, can take a biological sample from an animal at the same time he assigns an animal identification. The biological sample can be archived at archive site 812. To identify an animal that produced a meat product, a biological sample taken from a meat product can be compared to archived biological sample at, for example, genotyping laboratory 818. If a biological sample taken from a meat product matches an archived biological sample, the identity of the animal that produced the meat product can be ascertained.

In order to reduce the number of archived biological samples to which a sample from a meat product must be compared, animals and their respective meat products can be assigned a group identification at the harvest site (e.g., processing plant 806). Group identification numbers can be used to identify groups of cattle that are harvested together. In one embodiment of the present invention, each group can be defined as the smallest possible production unit where the co-mingling of animal parts does not occur. The harvest site operator can provide the group identification numbers to database 816, along with the premises identification for the processing plant, the date of harvest, and a list of all individual identifications for animals that constitute the group. In this case, to identify an animal that produced a meat product, a biological sample taken from the meat product can be compared to archived biological samples for only those animals that are members of the group that produced the meat product. Thus, linking of individual animal identifications to a group identification can facilitate the ability to confirm the true identity of a meat product that has been contaminated.

Utilization of group identifications can be implemented, for example, at the processing/packing plant. In the United States, the USDA Meat Inspection Service currently requires all harvested meat products sold for consumption in the U.S. be labeled with the USDA Inspection Mark and USDA officials that work at each packing plant monitor and have oversight responsibility for verification of the labeling process. In addition to the USDA Inspection Mark many packing plants also label meat products with a specific lot number that enables tracking and recall of contaminated products when necessary. Unfortunately, current lot labeling is not standardized across all packing plants. Moreover, current USDA labeling practices only allow identification of a "batch" of meat products produced on a given date and do not allow identification of individual animals that comprise the harvested group. Processing/packing plants can modify lot numbers to accommodate group identifications.

Database 816 (e.g., a relational database) can maintain records of animal identifications and associated owner, premises and group identifications. Additionally, database 116 can include data to track the time periods in which an animal is associated with particular owner, premises and group identifications. If a bio-incident (e.g., contraction of a disease or bio-engineered agent) occurs during the animal's life, the database can locate owner and premises identifications based on the animal's animal identification. This gives an indication of who owned the animal and where the animal was located at any given period of time. From the owner and premises identifications, database 816 can be used to locate other animal identifications associated with the owner and premises identifications for overlapping time periods. In this manner, animals that potentially came in contact with the diseased or affected animal can be identified. Each of these animals can be located based on the current premises and/or owner identification associated with the animal's animal identification in database 116. In this manner, animals that may also have contracted the disease or become contaminated can be located, facilitating tracking and containment of disease or contamination. This process can be repeated through arbitrary degrees of separation from the animal that is originally identified as diseased or otherwise exposed to a bio-incident.

As an example of a pre-harvest incident, assume an animal at a feedlot is identified as having foot and mouth disease. According to one embodiment of the present invention, the animal identification for the affected animal can be read from, for example, an ear tag attached to the animal. Biological samples can optionally be taken from the affected animal and compared to the archived sample for the corresponding animal identification to ensure that the identification of the affected animal is accurate. Database 816 can be queried based on the assigned animal identification to find the origin (e.g., farm of birth) of the affected animal, locations where the affected animal was housed and dates the affected animal changed locations throughout its lifetime. Additionally, database 816 can be queried to determine additional suspect animals that were at the same locations during overlapping time periods as an affected animal. The locations where additional suspect animals were housed and the current locations of the additional suspect animals can also be found from database 116. Suspect animals can then be located and tested to determine if they too have contracted foot and mouth disease. The source and origin of the outbreak can be determined by finding the last common location that could give rise to the affected animals. The outbreak can then be contained and further actions taken based on the type and scope of the outbreak.

For contamination or adulteration of the meat supply (e.g., for post-harvest bio-incidents), individual animals associated with the same group identification as an affected meat product can be identified from data in database 816. Biological samples corresponding to each animal identification associated with the group identification can be located at archive 812. A DNA profile from the affected meat product can be compared DNA profiles generated from the selected biological samples at genotyping laboratory 818 to determine the particular animal in the group that produced the contaminated meat product. Database 816 can then be queried locate owner and premises identifications based on the affected animal's identification so that the animal's progress through the production cycle can be reconstructed.

As an example of a post-harvest incident, assume public health officials in a city determine that the common source of an outbreak of a disease among humans is based on the consumption of beefsteaks purchased from several different supermarkets in the city. The group ID numbers for the beefsteaks can be determined from packaging or supermarket records and all meat products in the affected group can be recalled. Additionally, database 816 can be queried to determine the date, time and location that the affected group id number was created and a list of animals that is included in the affected group. Biological samples can be taken from the affected meat products and can be compared to archived samples for the animals in the group to determine which animals in the group gave rise to the affected steaks. For an animal that gave rise to an affected steak, database 816 can be queried to locate the origin (e.g., farm of birth) of the affected animal, locations where the affected animal was housed and dates the affected animal changed locations throughout its lifetime as in the pre-harvest example discussed above. Furthermore, database 816 can be queried to locate additional animals that may be affected, as described in the pre-harvest scenario, so that the steps necessary to contain the outbreak can be implemented.

With respect to ground meat, a more forensic approach may be required. Ground meat can come from multiple sources, with a ground meat patty containing tissue from as many as 1000 individual animals. In one embodiment of the present invention, the contaminated product can be de-aggregated then diluted and plated such that each well would contain single source aggregates of cells (i.e., each will contain cells from a single source animal). These individual groups of cells can be genotyped and compared to archive samples of individuals from groups of animals until all source animals have been identified. Database 816 can then be queried for each source animal to determine the premises at which each animal was located and when an animal was located at each premises. From this information, additional potentially affected animals and meat products can be identified, as described in conjunction with the pre-harvest scenario.

In addition to identifying the animal(s) that produced a particular meat products, the archived biological samples can be used for auditing purposes. For example, an audit sample (e.g., blood, tissue or other biological sample known in the art) taken from individual animal in the production cycle can be compared with the archived sample associated with the animal identification on the identification device attached to that animal. If the new sample does not match the archived sample for the same animal identification, this can indicate that the identification device attached to the animal has been inappropriately altered. If there is a discrepancy between the audit biological sample and the archived sample, the differences can be investigated.

In one embodiment of the present invention, new biological samples can be compared to archived samples on the basis of Single-Nucleotide Polymorphism ("SNP") analysis. As would be understood by those of ordinary skill in the art, multiple SNP markers can be used to determine the probability that an individual chosen at random from the population could have the exact genotype as an archived biological sample. Using a conservative probability match rate, 26 to 27 markers at intermediate allele frequencies are required to reach a 1 in 98,000,000 probability of an audit sample matching a random archived sample. If additional SNP marker are used, say 30 to 40, the accuracy of discrimination between two animals will increase. If the result of comparing the audit sample to the archived sample based on SNP analysis match, there is a high probability that the audit sample and the archive sample were collected from the same animal. If the samples do not match, an investigation can be prompted to resolve the discrepancy. It should be noted that SNP analysis is provided by way of example and any scheme for comparing biological samples can be used.

In order to assess the risk and identify problem areas with system 800, animals and meat products, according to one embodiment of the present invention, can be audited throughout the different phases of the production cycle for an identity match with their corresponding archived samples. For each comparison between an audit sample and archive sample two outcomes are possible: either the audit sample matches with an underlying probability that it is the same animal (probability match rate), or it does not match the archive sample. Any audit samples not matching their corresponding archive sample genotype can be investigated. The first level of investigation, in one embodiment of the present invention, can allow the current owner to correct the error by submitting new audit samples for testing that he/she believes would correctly identify both the archive sample and the audit sample found to be in error. If these can be easily reconciled, then no further testing is warranted. If, however, the samples cannot be reconciled, then an investigation to determine the likely source of error is identified and appropriate samples are tested to determine the reason for the mismatched samples. Table 1 lists the numbers of individuals that can be identified given the actual proportion of mismatched samples.

TABLE 1

| Actual proportion of correctly identified samples | Number Sampled | | | |
|---|---|---|---|---|
| | 10,000 | 100,000 | 500,000 | 1,000,000 |
| | Number of mismatched samples | | | |
| 0.99999 | — | 1 | 5 | 10 |
| 0.9999 | 1 | 10 | 50 | 100 |
| 0.999 | 10 | 100 | 500 | 1,000 |
| 0.99 | 100 | 1,000 | 5,000 | 10,000 |
| 0.9 | 1,000 | 10,000 | 50,000 | 100,000 |
| 0.8 | 2,000 | 20,000 | 100,000 | 200,000 |
| 0.7 | 3,000 | 30,000 | 150,000 | 300,000 |
| 0.6 | 4,000 | 40,000 | 200,000 | 400,000 |
| 0.5 | 5,000 | 50,000 | 250,000 | 500,000 |

The number of individuals that must be sampled to ensure compliance can be dependent upon the number of mismatched cattle or other animal and the level of confidence required (i.e., the acceptable level of risk). If few individuals are mismatched, then to accurately estimate the actual proportion of mismatched samples in the entire population a greater number of individuals must be audited. The risk tolerance can be ascertained to determine the number of cattle that would be sampled in a year. Assuming the present invention is applied to the United States cattle industry and assuming that 0.5% of the population is audited per year out of 98,000,000 cattle, 500,000 cattle would be sampled and compared to the archive samples. Thus, 1,000,000 samples would be genotyped per year (500,000 audit samples and 500,000 archived samples).

From the results of the compliance audit, the estimated proportion of mismatched samples can be determined (Table 2). If extrapolated to the entire population of 98,000,000 cattle, the number of mismatched cattle in the entire cattle population can be estimated with 99% confidence. For example, if the estimated proportion of mismatched cattle is 1/100, then sampling 500,000 cattle would lead to the predicted number of mismatched cattle between 944,568 and 1,015,432 in the entire cattle population.

a global computer network, the Internet, a wireless network or other network known in the art) using, for example, computer 910. Computer 910 can be capable of reading a bar code or RFID from tag 906 and provide the animal tracking number, premises identification and date to database 816 according to any network communication protocol (e.g., telnet, FTP upload, HTTP post, a proprietary protocol or other network communications scheme known in the art). Similarly, feedlot 804 and grocery store 808 can provide information to database 816 using computers 912 and 914 respectively. Processing plant 806, on the other hand, can provide information to administrator 916 for manual entry to database 816. This information can be provided, for example, by way of facsimile machine 918. Thus, data can be communicated to database 816 via various methods including, but not limited to, network communications or manual entry.

When animal 902 is initially assigned its animal tracking number at farm 802, the animal tracking number, premises identity and date can be transferred to database 816 by computer 910 over network 908. Record 920 (records 920*a-d* represent the record for the animal with identification number 72456379102345 at various points in the production cycle) can be created in database 816 that lists the

TABLE 2

| | Number Sampled out of 98,000,000 total cattle | | | |
| --- | --- | --- | --- | --- |
| | 100,000 | | 500,000 | |
| Mismatched proportion | Number identified in Audit Program | 99% Confidence Interval for entire population | Number identified in Audit Program | 99% Confidence Interval for entire population |
| 1/10,000 | 10 | 1,821-17,779 | 50 | 6,239-13,361 |
| 1/1,000 | 100 | 72,781-123,219 | 500 | 86,745-109,255 |
| 1/100 | 1000 | 900,609-1,059,390 | 5000 | 944,568-1,015,432 |
| 1/10 | 10000 | 9,560,629-10,039,371 | 50000 | 9,693,169-9,906,831 |

Embodiments of the present invention can thus provide a system for tracking animals (cattle, poultry, swine or other animal known in the art) based on an animal identifications and biological samples. Although discussed in terms of the meat packing industry, animals can be tracked in any field in which animal tracking can be implemented (e.g., the forestry industry, the pet breeding industry, etc.). Embodiments of the present invention can optionally include auditing of assigned animal identifications based on biological samples to provide more reliable tracking.

Figure 9:
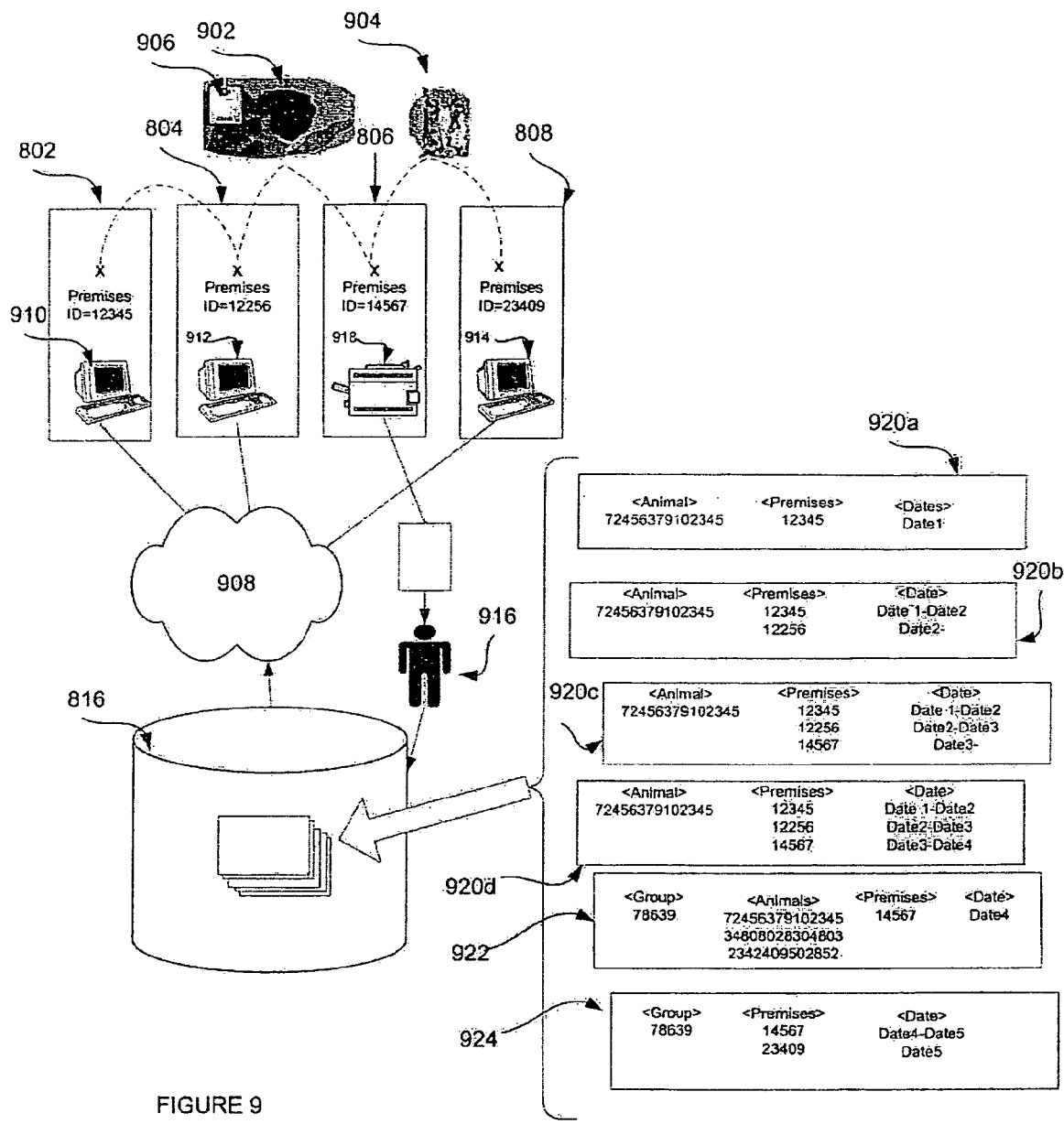
FIG. 9 is a diagrammatic representation of a system for identifying and tracking animals according to one embodiment of the present invention.

FIG. 9 is a diagrammatic representation of a system for identifying and tracking animals according to one embodiment of the present invention. In FIG. 9, an animal 902 moves through the production cycle from a farm of origin 802, to a feedlot 804 to a processing plant 806. At processing plant 806, animal 902 can be transformed into meat product 904 for shipment to grocery store 808. For the sake of example, animal 902 can be assigned the animal tracking number (e.g., the animal identification) 72456379102345 on identification device 906 (e.g., ear tag 906). Additionally, for the sake of example, farm of origin 802 can be assigned the premises id 12345, feedlot 804 premises id 12256, processing plant 806 premises id 14567 and grocery store 806 premises id 23409. Owner identifications have been omitted for the sake of simplicity.

Each premises can provide information to database 816 in a variety of manners. For example, farm 802 can provide data to database 816 via a network 908 (e.g., a LAN, a WAN, animal identification, date the animal was assigned the identification and an associated premises identification. Thus, record 920*a* is created based on the input from farm 802.

Each time the animal changes premises record 920 can be updated. When animal 902 moves to feedlot 804, the record can be updated to reflect the date of the move and the new premises, as shown in record 920*b*. Similarly, when animal 902 moves to processing plant 806, the record can be updated to reflect the date of the move and the new premises, as shown in record 920*c*. When animal 902 is harvested, the date of harvest can be recorded, as shown in record 920*d*. Additionally, at harvest, animal 902 can be assigned to a group having the group ID number 78639. For group 78639, record 922 can reflect the date of harvest, the individual animal identification numbers for each animal in the group and premises of harvest. When meat product 904 is shipped to grocery store 808, record 924 can be created that shows the date of shipment and the premises to which the meat products are shipped.

If a bio-incident occurs or animal 902 contracts a contagious disease when animal 902 is identifiable by identification device 906, database 816 can be queried for record 920 corresponding to animal tracking number 72456379102345. Based on record 920, the places where animal 902 was housed and the dates at which animal 902 was at each location can be discerned. By cross-referencing database records based on intersects between premises and dates, other animals that were potentially in contact with animal 902 at a particular premises can be located. For example, by locating the intersect between records that contain premises ID 12256 and dates between date 2 and date 3, each animal that potentially came in contact with animal 902 at feedlot 804 can be identified. Locations where each of these additional animals have been housed and their current locations can also be determined from database 816. Based on this information, these additional animals can be located and tested to determine if they too are contaminated or affected. The source or origin of the outbreak can be determined by finding the last common location of diseased or affected animals.

In the case of post-harvest contamination or adulteration of the meat supply, a group identification number (e.g., group ID 78639) can be determined for, for example, meat product 904 based on grocery store records, packaging or other scheme. From the group ID 78639, record 924 can be accessed to determine any other locations at which meat product 904 was located. Additionally, record 922 can be accessed to determine other animals that were in the same group. In this case, animal 902 can be identified as a member of the group having the group ID 78639 from record 922. By comparing a DNA sample from the contaminated meat (e.g., meat product 904) to a biological samples archived for animals in the group, animal 902 can be identified as the animal that produced meat product 904. When animal 902 is identified as the animal that produced meat product 904, record 920 can be accessed to determine where animal 902 was located and the dates that animal 902 was at each location. Additional animals that may have come in contact with animal 902 can be identified, as described above in the pre-harvest scenario.

In the above examples, data on animals and premises can be tracked based on database records. However it should be understood that data can be maintained in any format such as through entries in a relational database associated together through pointers, as files, indexed files, or according to any other searchable data storage scheme known in the art. Additional data can also be maintained and associated with animals and premises, such owner identifications or any other arbitrarily defined data. The data may be maintained in any suitable programming structure and/or according to any language known in the art.

Thus, database 816 can be used to track information relating to the identity, ownership and location of animals over time. Database 816 can provide a highly available, secure computer system for identifying and tracking animals. Publicly available or proprietary software applications can be configured for data query, retrieval, and analysis and a comprehensive security and auditing system can be implemented to both protect the integrity of the data and validate results. Database 816 can either be deployed in a centralized location or be distributed across several sites. The data environment can be available on a 24×7×365 basis to both support ongoing data submission and query needs for tracking and identifying animals and responding to bio-incidents. In one embodiment of the present invention, database 816 follows the model of a highly secure Internet data portal. Authorized users of the database 816 submit and query data electronically via the Internet. A support center can manage all non-network (e.g., telephone, fax or other non-network communication) data submissions and queries. Database 816 can also interact with and support the computer systems at the archive site(s) and the DNA genotyping laboratory.

Figure 10:
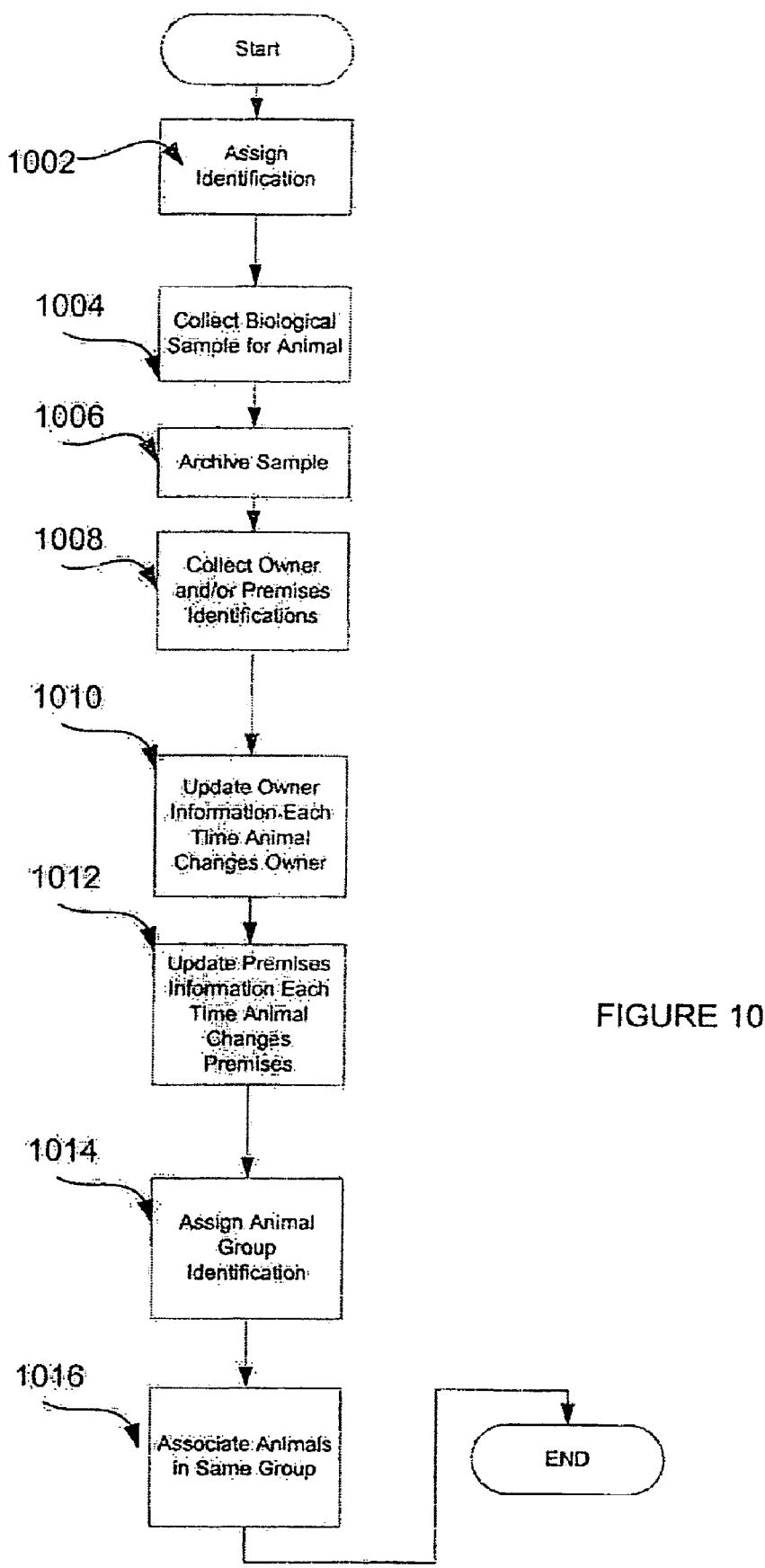
FIG. 10 is a flow chart illustrating one embodiment for tracking an animal.

FIG. 10 is a flow chart illustrating one embodiment of a method for tracking an animal. At step 1002, an animal can be assigned an identification such as an animal tracking number. The identification number, according to one embodiment of the present invention, can be attached the animal in the form a tag carrying a bar code or RFID. In other embodiments of the present invention, the animal can be branded, provided with an implant or provided with an identification according to any other animal identification technology known in the art. Additionally, a biological sample can be taken from the animal (step 1004), which can be associated with the animal identification and archived (step 1006). FIG. 1 illustrates one embodiment for a device for providing an animal identification to an animal and collecting a biological sample, though any scheme for assigning animal identifications and collecting samples may be used.

The animal identification along with an owner identification and premises identification can be collected and stored in, for example, a database (step 1008). Thus, in steps 1002-1008 an animal can be assigned an identification, which can be associated with an owner and premises identification for the animal. Additionally, a biological sample can be collected and archived for the animal. Over time, however, an animal may change premises or owners. Each time this occurs, the premises and/or owner data for the animal can be updated (step 1010 and step 1012). This can be done, for example, by scanning a bar code or reading a RFID associated with the animal identification device for a particular animal and sending the animal identification, along with the new premises and/or owner identification, to the database.

After harvest, the unique animal identification will typically not be ascertainable from the identification device, as it is unlikely that the identification device will travel with the animal carcass or meat products. Therefore, group identifications (e.g., group ID numbers) can be assigned (step 1014) at the harvest site to link animals to meat products. Group ID numbers can be used to identify groups of cattle (or other animals) that are harvested together. Group ID numbers can be assigned at the initial point of harvest and each group can be defined as the smallest possible production unit where the co-mingling of animal parts does not occur. The harvest site operator can provide the group ID numbers to the database along with the premises identification where harvest occurred, the date of harvest, and a list of all individual animal identifications for animals that constitute the group (step 1016). Linking of individual animal identifications to the group ID number can facilitate the process of tracking on a forward going basis and increase the ability to confirm the true identity of a meat product that has been contaminated.

In summary, one embodiment of the present invention can include assigning an animal identification to an animal, collecting a biological sample from the animal and associating the animal with each premises at which the animal is located. The animal can be associated each premises by associating the animal identification for the animal with a premises identification for each premises. Additionally, embodiments of the present invention can include associating an animal with owners by, for example, associating the animal identification with an owner identification for each owner. An animal can also be associated with a group that comprises a set of animals. The group of animals can be defined, according to one embodiment of the present invention, as the smallest production unit where the co-mingling of animal parts does not occur. It should be noted that assigning an animal identification to the animal and collecting the biological sample can occur approximately simultaneously using, for example, an identification device such as that described in conjunction with FIG. 1.

Figure 11:
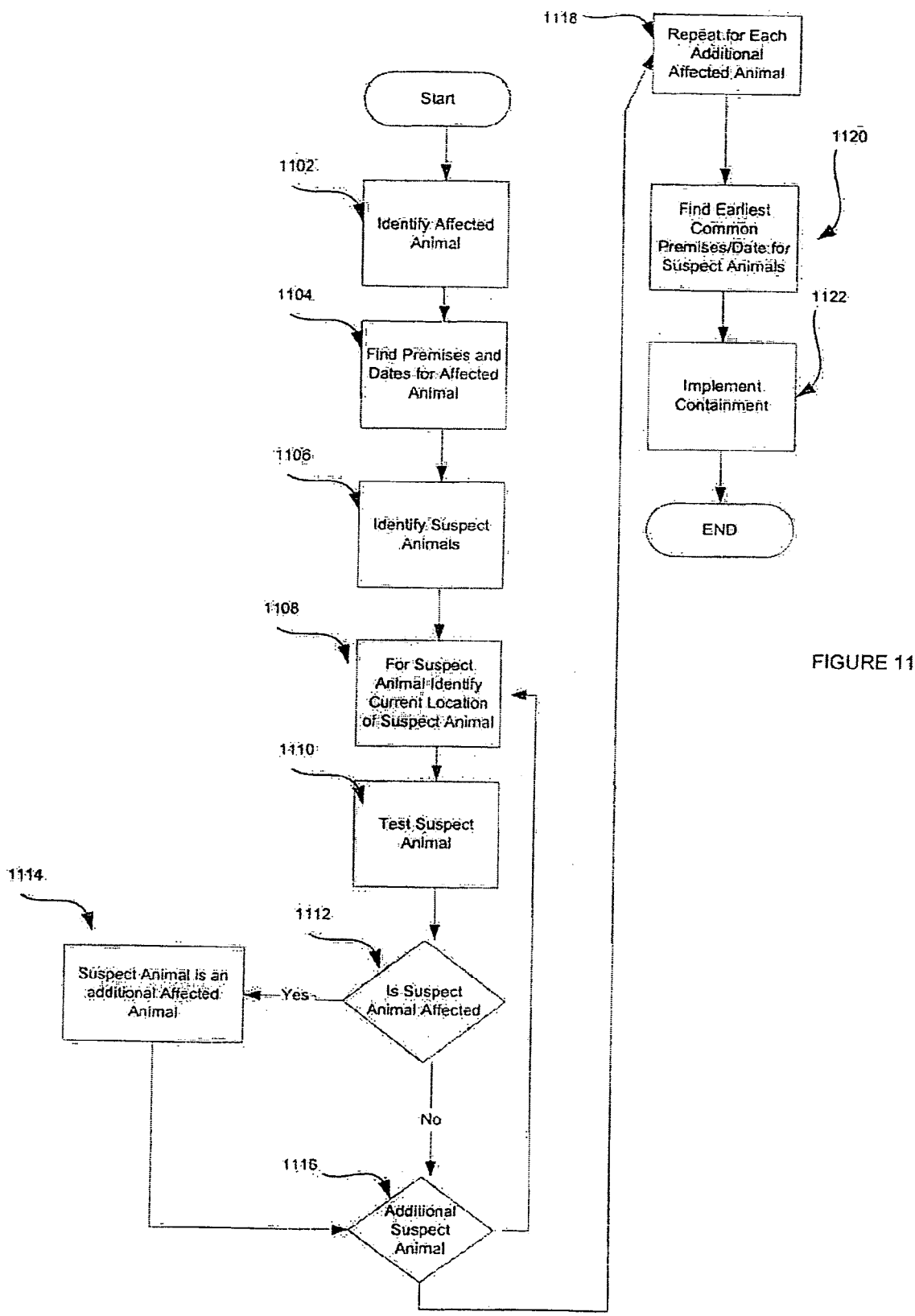
FIG. 11 illustrates one embodiment of identifying animals potentially affected by a bio-incident or disease according to one embodiment of the present invention.

FIG. 11 illustrates one embodiment of a method for identifying animals potentially affected by a bio-incident or disease. At step 1102, an animal exposed to a disease agent or other deleterious event can be identified. The animal's progress through the production cycle can be recreated by identifying each premises at which the animal was located and the time period the animal was at the premises (step 1104). At step 1106, animals that potentially came in contact with the animal identified at step 1102 (i.e., suspect animals) can be identified by cross-referencing premises identifications and dates. At step 1108, the current location of each suspect animal (or its meat products) can be determined (e.g., from database 816 of FIG. 8) and the suspect animals and/or meat products can be tested (step 1110) to determine if they too are affected (step 1112). If the suspect animal is affected it can be classified as an additional affected animal (step 1114). Similarly, if a meat product is found to be contaminated, the animal from which the meat product came can be classified as an additional affected animal. At step 1116, steps 1108 through 1114 can be repeated for each suspect animal and, at step 1118, steps 1102-1116 can be repeated for each additional affected animal discovered at step 1112. The source and origin of the outbreak can be determined by finding the last common location that could give rise to the affected suspect animals (step 1120) and the outbreak can then be contained and further actions taken based on the type and scope of the outbreak (step 1122).

Thus, one embodiment of the present invention can include locating each premises at which a first animal was located. Embodiments of the present invention can also include determining a set of animals that were at a same location as the first animal in an overlapping time period based on associations between each animal from the set of animals and the premises at which each animal was located. In other words, intersects between animals, premises and times can be identified to determine animals that were potentially in contact with each other at a particular premises. This can aid in identifying animals that are potentially affected by a bio-incident, disease or contamination and determining the origin of the contamination bio-incident, disease or contamination so that appropriate containment steps can be implemented.

Figure 12:
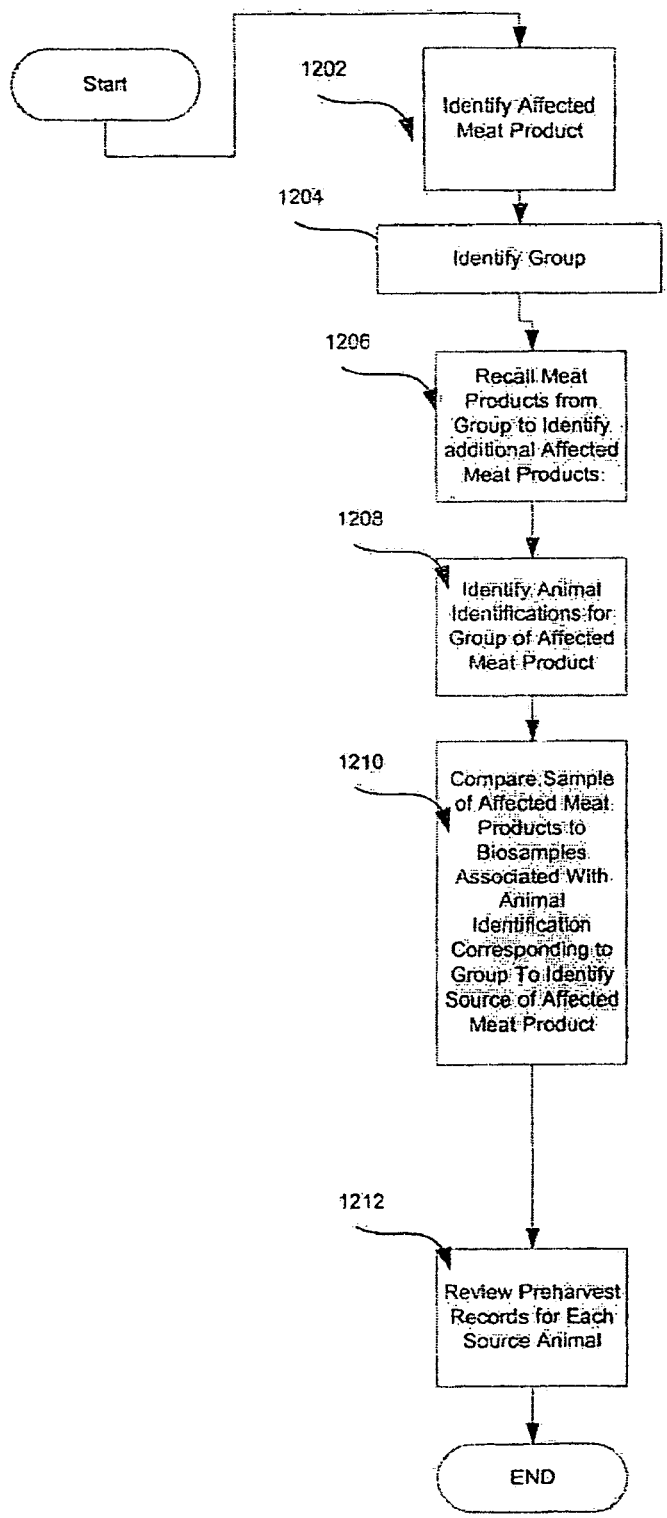
FIG. 12 is a flow chart illustrating one embodiment of a method for identifying animals potentially affected by a bio-incident or disease based on post harvest contamination.

FIG. 12 is a flow chart illustrating one embodiment of a method for identifying animals potentially affected by a bio-incident or disease based on post harvest contamination, according to one embodiment of the present invention. At step 1202, a contaminated meat product can be identified using any scheme for detecting a contaminated meat product known in the art. Based on the meat product contaminated, a corresponding group identification can be determined (step 1204) and meat products in that group recalled (step 1206). Testing can be done on the recalled meat products to determine if additional meat products are affected.

For a group of meat products, the constituent animals of the group can be determined by, for example, querying a database associating group identifications with individual animal identifications (step 1208). At step 1210, the archived biological samples for each animal in the group can be accessed and compared to the affected meat product to identify which animal the produced the affected meat product. The comparison can be based, for example, on SNP analysis of the affected meat product and archived samples or any other analysis of biological materials known in the art. It should be noted that only a portion of the biological samples for a group may have to be compared to an affected meat product if the comparison between the meat product and biological samples produces a match before all the biological samples for the group are compared. In other words, the comparisons between a meat product and biological samples can cease once a matching biological sample is found for a particular meat product. In another embodiment of the present invention, the meat product can be compared to every archived biological sample to identify the animal that produced the meat product.

When the animal that produced the affected meat product is identified, the animal's progress through the production cycle can be determined (step 1212). This can be done, in one embodiment of the present invention, by querying a database that associates an identification for the animal with the dates the animal was at a particular premises and/or owned by particular owners. Additional suspect and affected animals can then be identified as described in conjunction with FIG. 11.

Embodiments of the present invention can thus include selecting a meat product, determining that the meat product is associated with a group, locating a set of biological samples corresponding to each of a set of animals belonging to the group and comparing an analysis of the meat product to an analysis of at least a portion of the set of biological samples to determine that the meat product was produced by a particular animal. Alternatively, the meat product can be compared to an arbitrary set of biological samples to determine that the meat product was produced by a particular animal.

Figure 13:
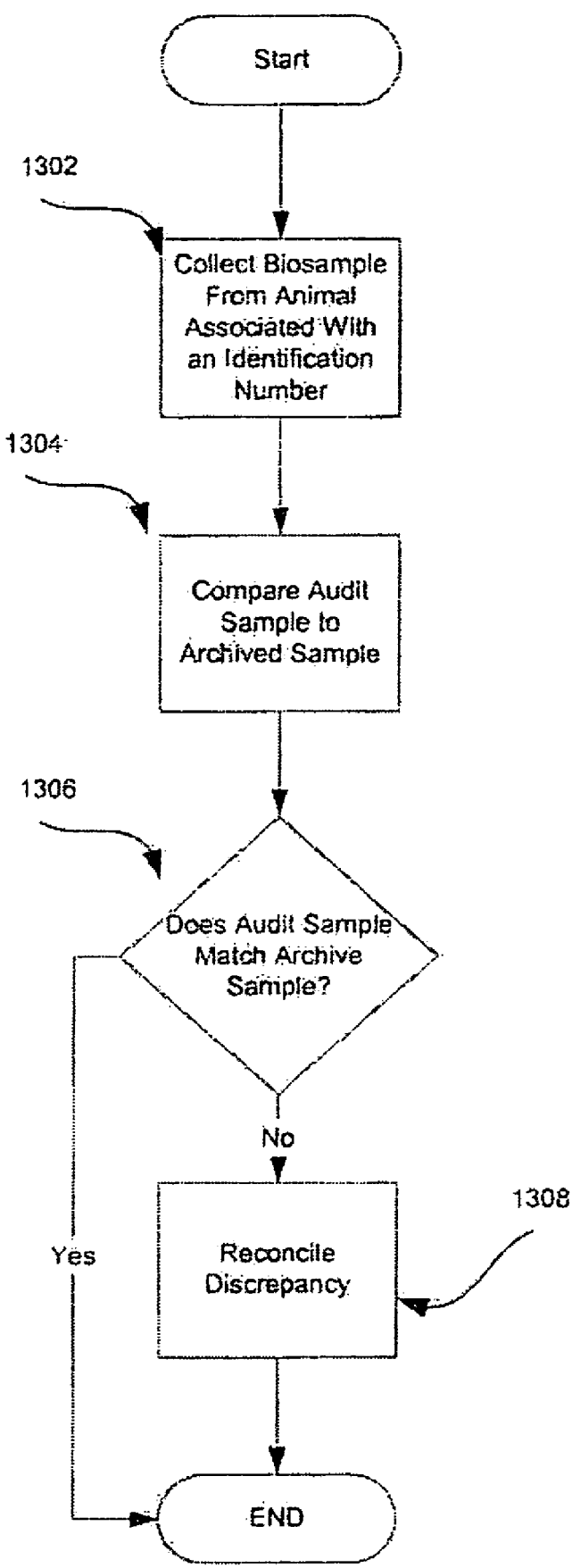
FIG. 13 illustrates one embodiment of a method for auditing animal identifications.

FIG. 13 illustrates one embodiment of a method for auditing animal identifications. At step 1302, a biological audit sample can be collected from an animal assigned an animal identification. The audit sample, at step 1304, can be compared to an archived biological sample corresponding to the same animal identification. The comparison can be performed based on any biological sample analysis known in the art, including, but not limited to, SNP analysis. If the audit sample does not match the archived sample for the same animal identification, as determined at step 1306, an investigation can be initiated, at step 1308, to reconcile the discrepancy. One embodiment of the present invention can allow the current owner to correct the error by submitting new audit samples for testing that he/she believes would correctly identify both the archive sample and the audit sample found to be in error. If these can be easily reconciled, then no further testing is warranted. If, however, the samples cannot be reconciled, then an investigation to determine the likely source of error is identified and appropriate samples are tested to determine the reason for the mismatched samples.

Figure 14:
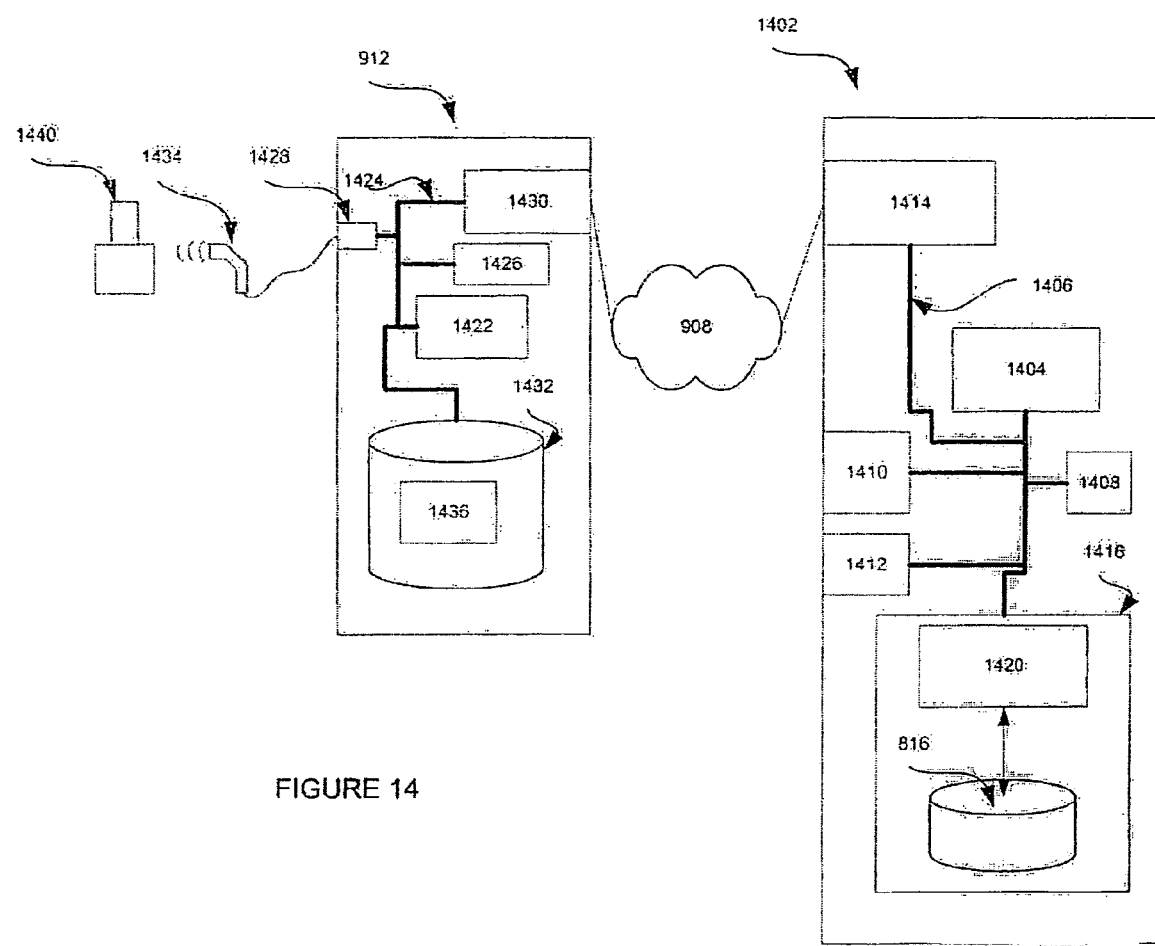
FIG. 14 is a diagrammatic representation of one embodiment of a system for tracking animals.

FIG. 14 is a diagrammatic representation of one embodiment of a system 1400 for tracking animals. In system 1400, a centralized computer system 1402 can receive information from a remote computer, such as computer 912 from FIG. 9, via a network 908 (e.g., the Internet, a wireless network, a LAN, a WAN, a fiber channel network or other data communications network known in the art). For the purposes of example, centralized computer system 1402 can comprise a main processor 1404, a bus 1406, a primary storage medium 1408, an I/O interface 1410, a graphics interface 1412, a network interface 1414 and a secondary storage medium 1416. Other devices may be connected to or be part of system 1402 including, by way of example, but not limitation, controllers, a display, a mouse, a keyboard, and so forth. System 1402 can include additional interfaces to communicate to additional networks using various protocols and can include interfaces for administrative functions.

The main processor 1404 communicates with the other components by way of the bus 1406. This main processor 1404 can be a general purpose processor, a limited processor such as an ASIC or microcontroller, or any other instruction execution machine. The primary storage 708 (e.g., RAM, ROM, magnetic storage or other storage medium known in the art) can provide transient memory or storage space for use by programs executing on the main processor 1404. The main processor 1404 communicates with the primary storage in any manner known in the art. Secondary storage medium 1416 can also include any computer readable storage medium, such as a hard drive, CD-ROM, floppy, tape drive, optical storage medium, memory or other storage medium known in the art. The main processor 1404 can communicate with the secondary storage to read and/or write to/from the storage medium 1416. Computer system 1402 may communicate with other computing devices (e.g., user devices, network servers, etc.) by way of networks using network interfaces (e.g., network interface 1414). Computer instructions running on the main processor may then access other computers across the network using any publicly available or proprietary network communications protocol.

In one embodiment of the present invention, storage medium 1416 can store a set of computer instructions 1420 that are executable by processor 1404. During execution, portions of computer instructions 1420 and data can be stored in primary storage 1408, as would be understood by those of ordinary skill in the art. Processor 1404 can execute computer instructions 1420 to maintain and update database 816 of animal identifications and associated data.

Computer 912 can similarly comprise a main processor 1422 (e.g., CPU, ASIC or other processor known in the art), a bus 1424, a primary storage medium 1426, an I/O interface 1428, a network interface 1430 and a secondary storage medium 1432. Other devices may be connected to or be part of system 912 including, by way of example, but not limitation, controllers, a display, a mouse, a keyboard, and so forth. A scanning device 1434 (e.g., a bar code scanner, RFID reader or other scanning device known in the art) is connected to computer 912 via I/O interface 1428. Computer 912 can include additional interfaces to communicate to additional networks using various protocols and can include interfaces for administrative functions. Secondary storage medium 1432 can include computer instructions 1436 executable by main processor 1422 to collect information from an animal identification device 1440 and execute protocols to communicate with computer system 1402 via network 908.

In operation, computer instructions 1436 can be executable to read an animal identification (e.g., animal identification number 72456379102345 from FIG. 9) from identification device 1440 using, for example, scanning device 1434. Computer instructions 1436 can communicate the animal identification to computer system 1402 via network 908 along with, for example, a premises identification (e.g., premises identification 12256 for the feedlot). At computer system 1402, computer instructions 1420 can be executable to update database 816 to create an association between the animal identification and the premises identification. Additionally, computer instructions 1420 can record a time entry for the association based on a time provided by computer 912 or determined by computer system 1402. Each time the particular animal changes premises, computer instructions 1420 can update the associations for animal identification number 72456379102345 to reflect the new premises and time information. Computer instructions 1420 can be further executable to create associations between animal identifications and owner identifications and between animal identifications and group identifications.

According to one embodiment of the present invention, computer instructions 1420 can query database 816 to determine animals that were located at the same premises at the same time. As an example, computer instructions 1420 can executable to locate the premises identifications associated with animal identification number 72456379102345. From FIG. 9, these premises identifications can be 12345, 12256, 14567 and 23409. Additionally, computer instructions 1420 can determine the dates for which animal identification number 72456379102345 was associated with each of the premises. From this information, computer instructions 1420 can determine additional animal identifications that are associated with the same premises identifications for overlapping time periods and the present premises identification with which of each of these additional animals identifications is associated. Consequently, animals that potentially came in contact with the animal bearing identification number 72456379102345 can be located. Similarly, computer instructions 1420 can be executed to determine additional animal identifications associated with the same group identification and/or owner identification as animal identification 72456379102345. In this manner, animals that were slaughtered together and/or commonly owned can be determined.

In the example of FIG. 14, associations between animal identifications, premises identifications, owner identification and/or group identifications are maintained in database format. It should be noted, however, that this information can be stored in any data storage format known in the art and can be accessible using any suitable program structure and/or language. Additionally, while shown on a single storage medium in FIG. 14, computer instructions 1420 and database 816 can be distributed among multiple storage media. Each of computer 912 and computer system 1402 can comprise a standalone device, a distributed device or device that shares components (e.g., processors, memory, interfaces, controllers) with other processes.

One embodiment of the present invention can, thus, comprise include a set of computer instructions stored on a computer readable medium that are executable by a processor to receive a first animal identification for a first animal and associate the first animal identification with a premises identification for each premises at which the first animal is located. The computer instructions can also be executable to determine each premises at which the first animal was located based on the first animal identification and the associated premises identifications and determine a set of animal identifications for animals that where at the same locations during overlapping time periods. Additionally, the computer instructions can be executable to determine a set of animal identifications associated with a group identification and/or an owner identification.

While identification and tracking of animals has been discussed primarily in the context of managing bio-incidents, it should be noted that embodiments of the present invention can identify, sample and track animals for a variety of purposes. In addition to the monitoring, analysis, control and containment of bio-incidents and disease outbreak(s), an integrated animal identification, sampling and tracking program can also be used for other important applications including, parentage and pedigree determination, breed determination, genetic improvement, the protection of animal germ lines and genetics, branding and certification of value-added products, sourcing and selection of animals with specific traits and genetic potential, and the management of breeding and cloning strategies.

For example, in one embodiment of the present invention, additional data can be associated with an animal identification in a database including, but not limited to, genotype information, traits and growth performance data. This can allow effective identification, tracking and sorting of animals individually, accurate and complete record keeping of genotypes and traits or characteristics for each animal, and production of an economic end point determination for each animal using growth performance data. Accordingly, the present invention provides a method for sorting and tracking animal subjects. One embodiment of the present invention can include assigning an identification to a number of animal subjects and inferring traits for the animal subjects. For example, an identification can be assigned to a first animal subject and a second animal subject. Additionally, a trait can be inferred for the first animal subject and the second animal subject from biological samples of the animal subjects. The inference for each animal subject can be made by a method that includes identifying the nucleotide occurrence of at least one single nucleotide polymorphism, wherein the nucleotide occurrence is associated with the trait. Embodiments of the present invention can include sorting the first animal subject and the second animal subject based on the inferred trait. Embodiments of the present invention can further include identifying the first animal subject and the second animal subject using the animal identification devices as described in conjunction with FIG. 1 and tracking the first animal subject and second animal subject using a database, or other data storage format, as described in conjunction with FIG. 8. In this case, however, the database can further include information related to particular traits, such that animals can be searched by traits, in addition to premises identifications, animal identifications, owner identifications and/or other parameters.

Another embodiment of the present invention includes assigning an identification and measuring a physical characteristic of the first animal subject and the second animal subject, and sorting and tracking the first animal subject and the second animal subject based on both the inferred trait and the measured physical characteristic. The physical characteristic can be, for example, weight, breed, type or frame size, and can be measured using many methods known in the art, such as by using ultrasound. The physical characteristic information can be stored in a database, or other data storage medium.

In another aspect, the present invention provides identification and tracking of animals whose genetic variation has been analyzed and would lead to the production of animals with consistent desirable characteristics, such as animals that yield a high percentage of lean meat and a low percentage of fat efficiently. Accordingly, in one aspect the present invention provides a method for identification, selection and breeding of animal subjects for a trait. The method includes inferring a trait of a set of animal candidates for use in breeding programs from a nucleic acid sample of the animal candidates. The inference is made by a method that includes identifying the nucleotide occurrence of at least one single nucleotide polymorphism (SNP), wherein the nucleotide occurrence is associated with the trait. Individuals are then selected from the group of candidates with a desired trait for the trait for use in breeding programs. Animals sharing a particular trait can be identified using a database, such as database 816 of FIG. 8, that can track animals based on animal identifications. Genetic samples can, in one embodiment of the present invention, be associated through the animal identification. The animal identification can be assigned and the genetic sample can be taken at approximately the same time using, for example, an identification device as described in conjunction with FIG. 1.

In another aspect the present invention provides for identification and tracking of an animal subject with a specific trait or series of traits, for the purpose of cloning. The method includes identifying nucleotide occurrences of at least two SNPs for the animal subject, isolating a progenitor cell from the animal subject, and generating a cloned animal from the progenitor cell. The method can further include before identifying the nucleotide occurrences, identifying the trait of the animal subject, wherein the animal subject has a desired trait and wherein the at least two SNPs affect the trait.

Embodiments of the present invention can thus identify and track animals that have superior traits, predicted very accurately, that can be used to identify parents of the next generation through selection. These methods can be imposed at the nucleus or elite breeding level where the improved traits would, through time, flow to the entire population of animals, or could be implemented at the multiplier or foundation parent level to sort parents into most genetically desirable. Embodiments of the present invention can including identifying and tracking animals to facilitate determining the optimum male and female parent to maximize the genetic components of dominance and epistasis thus maximizing heterosis and hybrid vigor in the market animals.

In another aspect, embodiments of the present invention provides identification and tracking of a animal subject diagnosed for a health condition. The method includes drawing an inference regarding a trait of the animal subject for the health condition, from a nucleic acid sample of the subject. The inference is drawn by identifying, in the nucleic acid sample, at least one nucleotide occurrence of a single nucleotide polymorphism (SNP), wherein the nucleotide occurrence is associated with the trait.

The health condition that can be tracked for individually identified animals for this embodiment of the present invention, is resistance to disease or infection, susceptibility to infection with and shedding of pathogens such as *E. Coli,* salmonella, listeria and other organisms potentially pathogenic to humans, regulation of immune status and response to antigens, susceptibility to bloat, liver abscess or the buller syndrome, previous exposure to infection or parasites, or health of respiratory and digestive tissues.

This embodiment of the present invention can be useful for identifying and tracking, for example, bovines with an inferred beef characteristic from a nucleic acid sample of the subject animal (i.e., the trait is a characteristic of beef). Inferred beef characteristics that can be tracked by methods of the present invention include, for example, overall quality, marbling, red meat yield, tenderness, and the like. Accordingly, the present invention provides methods for identifying live cattle that have or that lack the genetic potential to produce beef that is well-marbled. Such information could be used by the cattle producer to channel calves into particular feeding regimens and to meet the requirements of specific marketing programs. Such information could also be used to identify cattle that are genetically superior candidates for breeding and/or cloning. Such information could also be used to identify cattle that are genetically inferior candidates to be screened out of a breeding or cloning program. Embodiments of the present invention can also be used for identifying and tracking animals that have been analyzed using methods that infer breed specificity. Such information could be useful for quality branding and confirmation of value-added animal products.

Thus, the biological sample taken from an animal can be used to determine a variety of information about the animal, including genetic traits. A trait can be associated with a particular animal be associating the animal identification with the trait in, for example, a database. The particular animal can be tracked through the production cycle by associating the animal identification with premises and/or owner identifications in the database. If a an animal with a particular trait (or other feature) is desired, the database can be queried for animals possessing the trait of interest. Based on the association between the trait and the animal identifications, a particular animal having the trait can be identified from the database. The location of the particular animal with the trait of interest can be identified based on the associations between animal's animal identification and the premises identifications. The animal can be physically identified at the premises based on an identification device that travels with the animal.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the scope of this invention as claimed below.

What is claimed is:

1. A method of tracking animals comprising:
   assigning an animal identification to a first animal;
   collecting a biological sample from the first animal;
   determining a set of animals that were at a same location as the first animal in an overlapping time period based on associations between each animal from the set of animals and the premises at which each animal was located; and
   associating the first animal with each premises at which the first animal is located.

2. The method of claim 1, wherein associating the first animal with each premises at which the first animal is located further comprises associating the animal identification with a premises identification for each premises.

3. The method of claim 1, further comprising associating the first animal with each owner of the first animal.

4. The method of claim 3, wherein associating the first animal with an owner further comprises associating the animal identification with an owner identification for each owner.

5. The method of claim 1, further comprising:
   determining each premises at which the first animal was located based on associations between the first animal and each premises at which the animal was located.

6. The method of claim 1, further comprising:
   assigning the first animal to a group, wherein the group comprises a set of animals.

7. The method of claim 6, wherein a group comprises the smallest production unit where the co-mingling of animal parts does not occur.

8. The method of claim 6, further comprising:
   identifying a meat product;
   determining that the meat product is associated with the group to which the first animal belongs;
   locating a set of biological samples corresponding to each of the set of animals belonging to the group;
   comparing an analysis of the meat product to an analysis of at least a portion of the set of biological samples to determine that the first animal produced the meat product.

9. The method of claim 8, further comprising:
   determining each premises at which the first animal was located based on associations between the first animal and each premises at which the animal was located.

10. The method of claim 1, further comprising:
    identifying a meat product;
    comparing the meat product to a set of archived biological samples to determine that the first animal produced the meat product.

11. The method of claim 1, wherein assigning the animal identification and collecting the biological sample occurs at approximately the same time.

12. A method of tracking animals, comprising:
    assigning an animal identification to an animal;
    collecting a biological sample from the animal and associating the biological sample with the animal identification;
    determining a trait of the animal based on the biological sample;
    identifying that the animal has the trait based on an association between the trait and the animal identification;
    associating the animal identification with at least one premises identification; and
    locating the animal based on an association between the animal identification for the animal and a particular premises identification.

13. The method of claim 12, further comprising:
    determining a trait of the animal based on the biological sample.

14. The method of claim 13, further comprising:
    associating the trait with the animal identification.

15. The method of claim 13, further comprising:
    collecting the biological sample at approximately the same time as assigning the animal identification; and
    determining the trait from the biological sample.

* * * * *